United States Patent
Hendry et al.

(10) Patent No.: US 10,880,565 B2
(45) Date of Patent: Dec. 29, 2020

(54) USE OF SPECIFIC HEVC SEI MESSAGES FOR MULTI-LAYER VIDEO CODECS

(71) Applicant: QUALCOMM Incorporated, San Diego, CA (US)

(72) Inventors: Fnu Hendry, Poway, CA (US); Ye-kui Wang, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 14/664,702

(22) Filed: Mar. 20, 2015

(65) Prior Publication Data

US 2015/0271525 A1    Sep. 24, 2015

Related U.S. Application Data

(60) Provisional application No. 61/969,798, filed on Mar. 24, 2014.

(51) Int. Cl.
*H04N 19/172*    (2014.01)
*H04N 19/107*    (2014.01)
(Continued)

(52) U.S. Cl.
CPC .......... *H04N 19/46* (2014.11); *H04N 19/105* (2014.11); *H04N 19/107* (2014.11);
(Continued)

(58) Field of Classification Search
CPC ...... H04N 19/00; H04N 19/70; H04N 19/105; H04N 19/107
See application file for complete search history.

(56) References Cited

U.S. PATENT DOCUMENTS 9,113,172 B2 *    8/2015 Hong ..................... H04N 19/70
2006/0251169 A1    11/2006 Wang
(Continued)

FOREIGN PATENT DOCUMENTS

CN    103548345 A    1/2014

OTHER PUBLICATIONS

Anonymous: "Text of ISO/IEC 14496-10:2008/FDAM 1 Multiview Video Coding", 85. MPEG Meeting; Jul. 21, 2008-Jul. 25, 2008; Hannover; (Motion Picture Expert Group or ISO/IEC JTC1/SC29/WG11), No. N9978, Dec. 7, 2008, XP030016472, pp. 68, ISSN: 0000-0039.

(Continued)

*Primary Examiner* — Brian T Pendleton
*Assistant Examiner* — Kyle M Lotfi
(74) *Attorney, Agent, or Firm* — Campbell C. Chiang; Shumaker & Sieffert P.A.

(57) ABSTRACT

Devices and methods for determining whether to initiate random access during decoding of video information. In one aspect, a device may include a memory configured to store video information that includes at least one recovery point supplemental enhancement information (SEI) message and a processor coupled to the memory. The processor is configured to determine whether the at least one recovery point SEI message comprises an indication to reset a picture order count (POC) semantic value. The processor is further configured to identify at least one of a first constraint regarding whether the recovery point SEI message is present in an access unit, a second constraint regarding an association of the recovery point SEI message with a picture, or a third constraint and determine whether to initiate the random access and decoding from the access unit based on at least one of the first constraint or the second constraint.

24 Claims, 12 Drawing Sheets

(51) Int. Cl.

| | |
|---|---|
| H04N 19/46 | (2014.01) |
| H04N 19/597 | (2014.01) |
| H04N 19/52 | (2014.01) |
| H04N 19/187 | (2014.01) |
| H04N 19/159 | (2014.01) |
| H04N 19/70 | (2014.01) |
| H04N 19/30 | (2014.01) |
| H04N 19/196 | (2014.01) |
| H04N 19/61 | (2014.01) |
| H04N 19/132 | (2014.01) |
| H04N 19/167 | (2014.01) |
| H04N 19/105 | (2014.01) |
| H04N 19/65 | (2014.01) |
| H04N 19/895 | (2014.01) |

(52) U.S. Cl.
CPC ......... *H04N 19/132* (2014.11); *H04N 19/159* (2014.11); *H04N 19/167* (2014.11); *H04N 19/172* (2014.11); *H04N 19/187* (2014.11); *H04N 19/196* (2014.11); *H04N 19/30* (2014.11); *H04N 19/52* (2014.11); *H04N 19/597* (2014.11); *H04N 19/61* (2014.11); *H04N 19/65* (2014.11); *H04N 19/70* (2014.11); *H04N 19/895* (2014.11)

(56) References Cited

U.S. PATENT DOCUMENTS

| | | | |
|---|---|---|---|
| 2010/0189182 A1* | 7/2010 | Hannuksela ... | H04N 21/234327 375/240.25 |
| 2012/0230433 A1* | 9/2012 | Chen ................. | H04N 19/503 375/240.25 |
| 2013/0235152 A1* | 9/2013 | Hannuksela ........... | H04N 19/70 348/43 |
| 2014/0218473 A1* | 8/2014 | Hannuksela ........ | H04N 19/597 348/43 |
| 2015/0103895 A1 | 4/2015 | Deshpande | |
| 2015/0156501 A1* | 6/2015 | Hannuksela ........... | H04N 19/70 375/240.12 |
| 2015/0271513 A1 | 9/2015 | Hendry et al. | |
| 2016/0065983 A1* | 3/2016 | Choi ...................... | H04N 19/70 375/240.12 |
| 2016/0323590 A1* | 11/2016 | Li .......................... | H04N 19/70 |

OTHER PUBLICATIONS

Chen J., et al., "MV-HEVC/SHVC HLS: SEI message cleanups (incorporated in HEVC scalable extension Draft 5 JCTVC-P1008_v4)", Joint Collaborative Team on Video Coding (JCT-VC) of ITU-T SG 16 WP 3 and ISO/IEC JTC 1, JCT3V-H0082/JCTVC-Q0183 Appendix, Mar. 25, 2014 (Mar. 25, 2014), pp. i-vi, 1-126, XP55216855, Retrieved from the Internet: URL: htip://phenix.int-evry.fr/jct2/.

Chen Y., et al., "MV-HEVC/SHVC HLS: On multi-mode bitstream extraction", 6. JCT-3V Meeting; Oct. 25, 2013-Jan. 11, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-F0091, XP030131502, Oct. 15, 2013 (Oct. 15, 2013), 9 pages.

Hannuksela M.M., et al., "Scope of SEI messages", 20. JVT Meeting; 77. MPEG Meeting; Jul. 15, 2006-Jul. 21, 2006; Klagenfurt, AT; (Joint Video Team of ISO/IEC JTC1/SC29/WG11 and ITU-TSG.16) No. JVT-T073, Jul. 12, 2006 (Jul. 12, 2006), XP030006560; 6 pages.

Hannuksela M.M., "MV-HEVC/SHVC HLS: Layer-tree POC", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0056-V2, Jan. 10, 2014 (Jan. 10, 2014), XP030115524, Chapters 1-3; abstract, pp. 1-16.

Hendry, et al., "MV-HEVC/SHVC HLS: On picture order count", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0041-v6, Jan. 2, 2014 (Jan. 2, 2014), XP030115502, pp. 12.

Hendry, et al., "MV-HEVC/SHVC HLS: On Recovery Point and Region Refresh SEI Messages", 7. JCT-3V Meeting, Jan. 11, 2014-Jan. 17, 2014, San Jose, (The Joint Collaborative Team on 3D Video Coding Extension Development of ISO/IEC JTC1/SC29/WG11 and ITU-T SG.16), URL: http://phenix.int-evry.fr/jct2/,, No. JCT3V-G0134, Jan. 4, 2014 (Jan. 4, 2014), XP030131912, 5 pages.

International Search Report and Written Opinion—PCT/US2015/022012—ISA/EPO—dated Oct. 6, 2015.

Partial International Search Report—PCT/US2015/022012—ISA/EPO—dated Jul. 1, 2015.

Sullivan G.J., "JCT-VC AHG report: Multi-layer picture order count derivation (AHG10)", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P0010, Jan. 9, 2014 (Jan. 9, 2014), pp. 1-16, XP030115482.

Tech G., et al., "MV-HEVC Draft Text 7", 7. JCT-3V Meeting; Jan. 11, 2014-Jan. 17, 2014; San Jose; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-G1004-v8, Mar. 17, 2014 (Mar. 17, 2014),130 Pages, XP030132042.

Wang Y-K., et al., "MV-HEVC/SHVC HLS: SEI message cleanups", 8. JCT-3V Meeting; Mar. 29, 2014-Apr. 4, 2014; Valencia; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-H0082, Mar. 25, 2014 (Mar. 25, 2014),pp. 1-6, XP030132140.

Wang Y-K (QUALCOMM): "AHG9: High-level syntax clean-ups", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/., No. JCTVC-K0120, Oct. 1, 2012 (Oct. 1, 2012), 7 pages; XP030113002.

Hendry, et al, , MV-HEVC / SHVC HLS: On recovery point and region refresh SEI messages, JCTVC-P0133_r1 & JCT3V-G0134_r1, Joint Collaborative Team on Video Coding (JCT-VC) of ITU-T SG 16 WP 3 and ISO/IEC JTC 1/SC 29/WG 11 16th Meeting: San Jose, Jan. 16, 2014, 5 pages.

Wang Y-K,"AHG9: Signalling of Regions of Interest and Gradual Decoding Refresh," (JCTVC-K0128), JCT-VC of ITU-T SG 16 WP 3 and ISO/IEC JTC 1/SC 29/WG 11, 11th Meeting: Shanghai, CN, Oct. 10-19, 2012, 4 pages.

\* cited by examiner

USE OF SPECIFIC HEVC SEI MESSAGES FOR MULTI-LAYER VIDEO CODECS

INCORPORATION BY REFERENCE TO PRIORITY APPLICATION(S)

This application claims the benefit of U.S. Provisional Application No. 61/969,798, titled "USE OF SPECIFIC HEVC SEI MESSAGES FOR MULT-LAYER VIDEO CODECS," filed Mar. 24, 2014, the disclosure of which is incorporated by reference herein.

BACKGROUND

1. Technical Field

This disclosure relates to the field of video coding and compression, and particularly to supplemental enhancement information (SEI) messages for multi-layer coding.

2. Description of the Related Art

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

SUMMARY

The systems, methods and devices of this disclosure each have several innovative aspects, no single one of which is solely responsible for the desirable attributes disclosed herein. In one aspect, a device may include a memory configured to store video information that includes at least one recovery point SEI message and a processor operably coupled to the memory. The processor is configured to determine whether the at least one recovery point SEI message comprises an indication to reset a picture order count (POC) semantic value. The processor is further configured to identify at least one of a first constraint regarding whether the recovery point SEI message is present in an access unit, a second constraint regarding an association of the recovery point SEI message with a picture, or a third constraint regarding an application of the recovery point SEI message to a set of layers. The processor is also configured to determine whether to initiate the random access and decoding from the access unit based on at least one of the first constraint or the second constraint.

In another aspect, a method for determining whether to initiate random access during decoding of video information of a multi-layer bitstream, the stored video information comprising at least one recovery point SEI message is disclosed. The method comprises determining whether the at least one recovery point SEI message comprises an indication to reset a POC semantic value. The method further comprises identifying at least one of a first constraint regarding whether the recovery point SEI message is present in an access unit, a second constraint regarding an association of the recovery point SEI message with a picture, or a third constraint regarding an application of the recovery point SEI message to a set of layers. The method also comprises determining whether to initiate the random access and decoding from the access unit based on at least one of the first constraint or the second constraint.

In another aspect, device for determining whether to initiate random access during decoding of video information of a multi-layer bitstream comprises means for storing video information that includes at least one recovery point SEI message, means for determining whether the at least one recovery point SEI message comprises an indication to reset a POC semantic value, means for identifying at least one of a first constraint regarding whether the recovery point SEI message is present in an access unit, a second constraint regarding an association of the recovery point SEI message with a picture, or a third constraint regarding an application of the recovery point SEI message to a set of layers, and means for determining whether to initiate the random access and decoding from the access unit based on at least one of the first constraint or the second constraint.

In an additional aspect, a non-transitory computer readable storage medium having stored thereon instructions that, when executed, cause a processor of a device to store video information that includes at least one recovery point SEI message, determine whether the at least one recovery point SEI message comprises an indication to reset a POC semantic value, identify at least one of a first constraint regarding whether the recovery point SEI message is present in an access unit, a second constraint regarding an association of the recovery point SEI message with a picture, or a third constraint regarding an application of the recovery point SEI message to a set of layers, and determine whether to initiate the random access and decoding from the access unit based on at least one of the first constraint or the second constraint.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise.

DETAILED DESCRIPTION

Figure 1A:
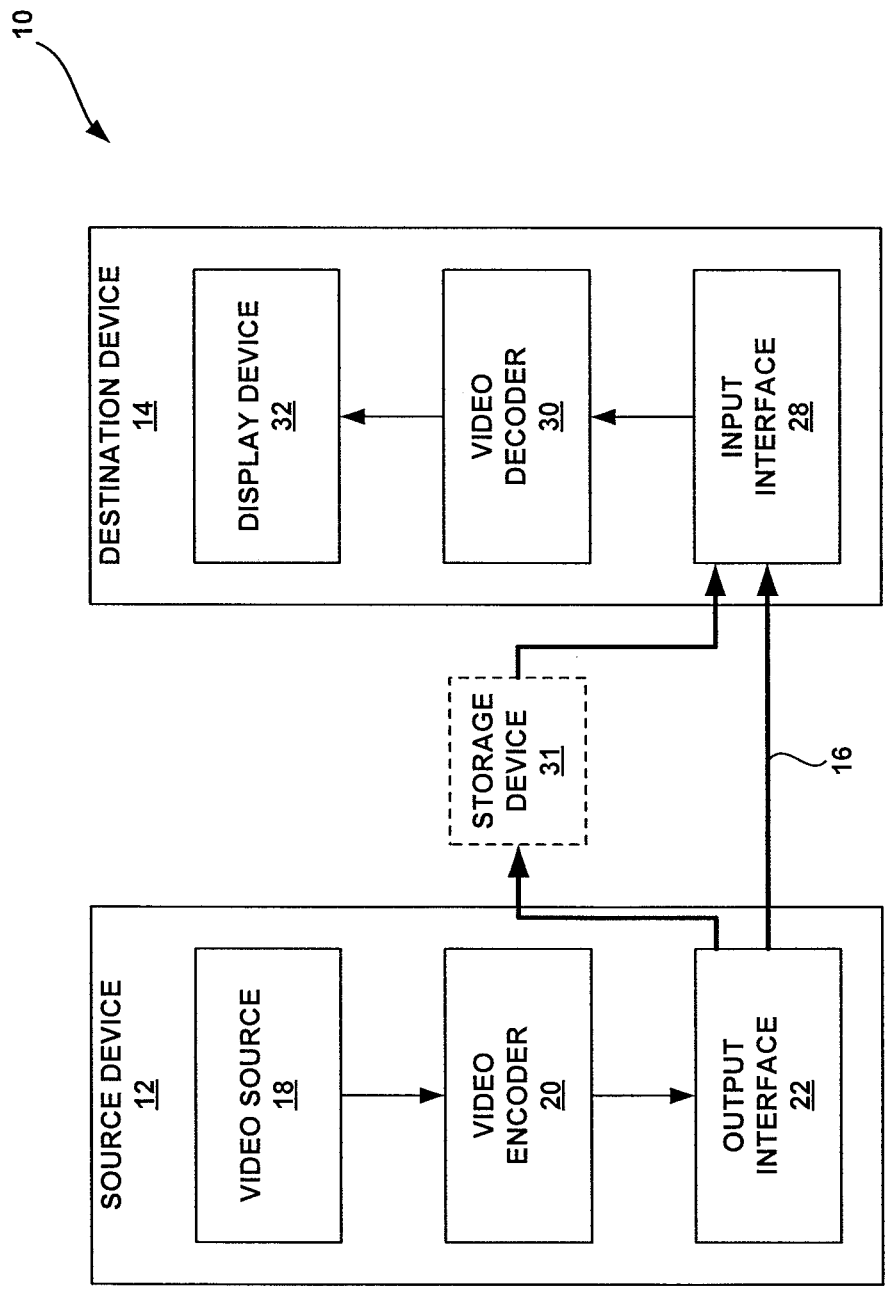
FIG. 1A is a block diagram illustrating an example video encoding and decoding system that may utilize techniques in accordance with aspects described in this disclosure.

In general, this disclosure relates to SEI messages, sequence parameter sets (SPS), recovery point SEI messages, and refresh information SEI messages for multi-layer video coding in the context of advanced video codecs, such as HEVC. More specifically, the present disclosure relates to systems and methods for increased clarity of the scope of SEI messages and association of SPS signaled in active parameter sets SEI message with layers to which they refer in multiview and scalable extension of HEVC, namely MV-HEVC (multi-view) and SHVC (scalable). The present disclosure also relates to system and methods for increased clarity in establishing picture order count semantics associated with recovery point SEI messages and relationships between region refresh information and inter-prediction constraints in the multiview and scalable extensions of HEVC, namely MV-HEVC and SHVC.

In the description below, H.264/AVC techniques related to certain embodiments are described; the HEVC standard and related techniques are also discussed. In particular, some video coding schemes include an SEI message which may provide various semantics that apply to one of access units, operation points, layers, or pictures for use when being decoded by the decoder. In conventional single-layer coding schemes (e.g., HEVC), each SEI message could only apply to a single layer, and thus a single access unit uniquely containing a single picture at a given time. Accordingly, the semantics of the SEI message in these conventional schemes were clear as to what they applied, be it a layer, an access unit, a picture, or an operation point. However, as discussed in greater detail below, an in multi-layer bitstreams, an SEI message may apply to one or more pictures, layers, operation points, or access units at a given time because the bitstream contains multiple layers at any given time. Thus, conventional single-layer coding schemes do not have the required semantics to define the scope of SEI messages for accurate and consistent behavior of video encoders/decoders that conform to multi-layer coding schemes.

This disclosure also relates to signaling multiple SPS by a single active parameter set SEI message and resolving ambiguities as to which layers each of the sequence parameter sets applies when there are unequal numbers of layers and SPS. In some implementations, constraints on restricting the number of SPS to "1" may be loosened to allow the active parameter set SEI message to introduce multiple SPS and to provide a mechanism for associating one or more SPS to one or more layers of the multi-layer bitstream. Additional semantics in either the active parameter set SEI message or an alternate SEI message enable the coding of a multi-layer bitstream to unambiguously associate more than one SPS with one or more specific layers. The operation of video encoders/video decoders that conform (i.e., operate in accordance with or are configured in accordance with) to this disclosure have improved operational consistency over conventional coding schemes.

This disclosure further relates to calculating or deriving a POC so as to avoid incorrect or unclear POC values for one or more pictures of the multi-layer bitstream. In a multi-layer bitstream, after a random access event, when decoding starts from an access unit containing a recovery point SEI message, one or more semantics of the recovery point SEI message reset one or more values identifying POC fields for the current picture to zero. This may create a problem when there is a picture picA in the same layer as the picture associated with the recovery point SEI message (and having the POC values reset to zero) when the picA follows the current picture in decoding order and has a signaled POC related value. Thus, conventional single-layer coding schemes do not have the required semantics to define how recovery point SEI messages are to be handled for accurate and consistent behavior of video encoders/decoders that conform to multi-layer coding schemes. Modifications to the recovery point SEI message are proposed to allow for derivation of the POC value of a picture that is associated with a recovery point SEI message as opposed to resetting the POC value when decoding after a random access with a recovery point message. Additionally, constraints to govern the presence of recovery point SEI messages in an access unit or association of recovery point SEI messages with a picture are disclosed herein.

This disclosure additionally relates to semantics for multi-layer coding schemes that resolve any ambiguity associated with region refresh information SEI messages. In some implementations, a region refresh information SEI message indicates that a region of a picture of a reference (or enhancement) layer is refreshed. In multi-layer bitstreams, such region refresh information SEI message may be configured to account for inter-layer prediction constraints, such that when a first picture relies on another picture to be refreshed before the first picture is fully refreshed, such reliance (or correspondence) is accounted for in the inter-layer region refresh predictions.

While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the scalable and multi-view extensions.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the scalable and multiview extensions.

In addition, a video coding standard, namely HEVC, has been developed by the Joint Collaboration Team on Video Coding (JCT-VC) of ITU-T Video Coding Experts Group (VCEG) and ISO/IEC MPEG. The full citation for the HEVC Draft 10 is document JCTVC-L1003, Bross et al., "High Efficiency Video Coding (HEVC) Text Specification Draft 10," JCT-VC of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
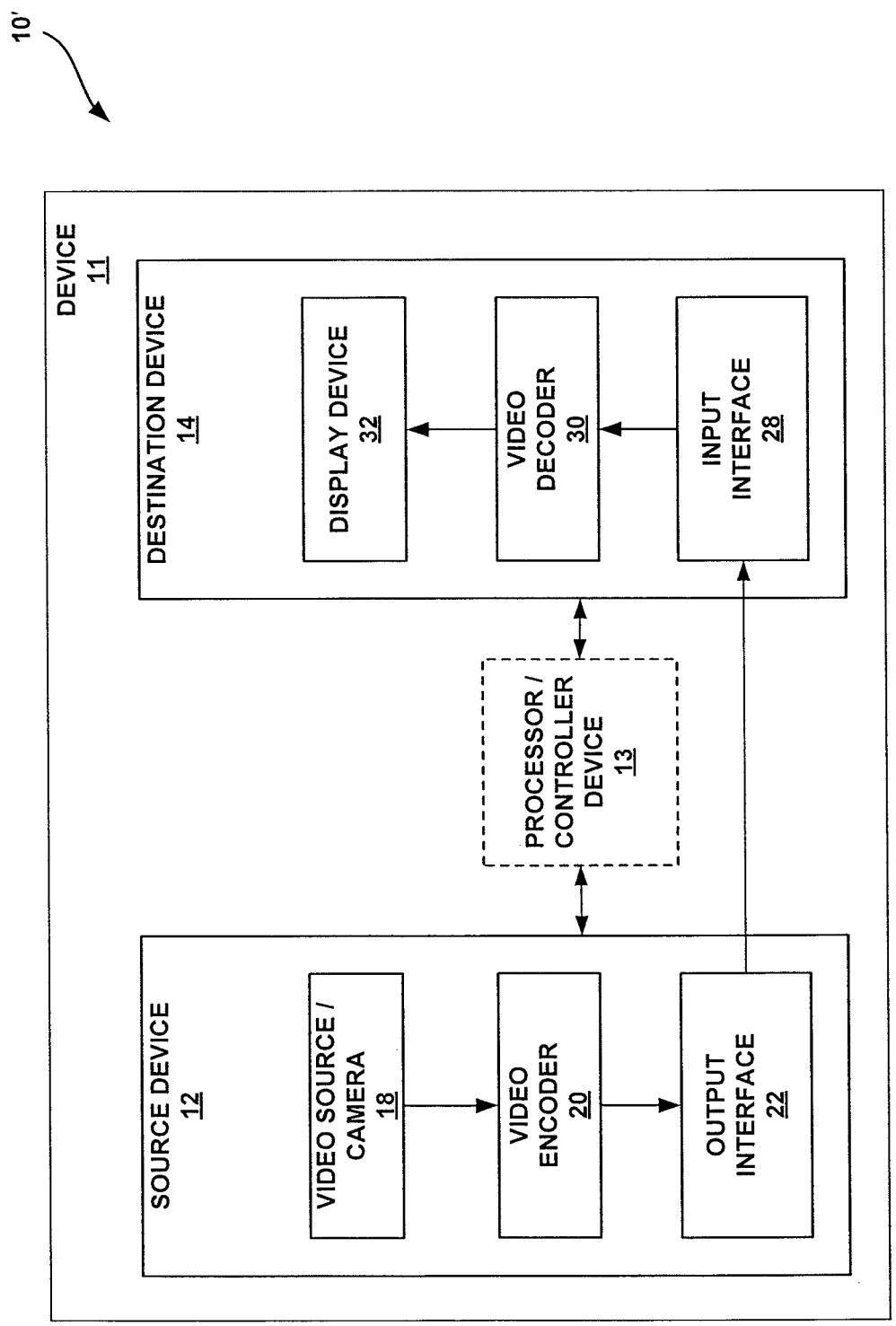
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to a storage device 31 (optionally present). Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A, the video encoder 23 illustrated in FIG. 2B, or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3A, the video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), SPSs, picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in the PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with TUs of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, SEI, an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2A:
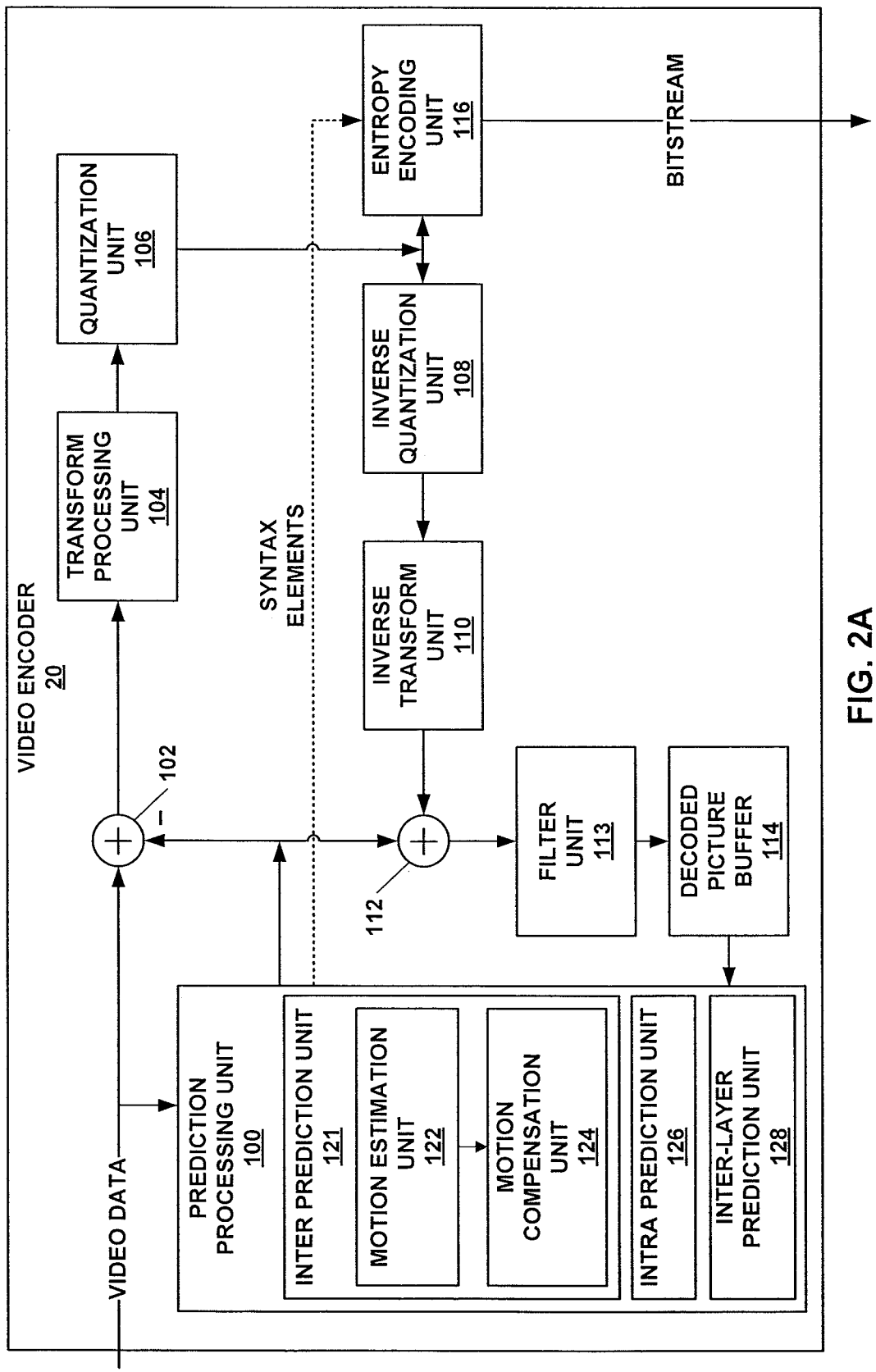
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra-prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2A separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra-prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SHVC (e.g., a base or reference/enhancement layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a PIPE coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
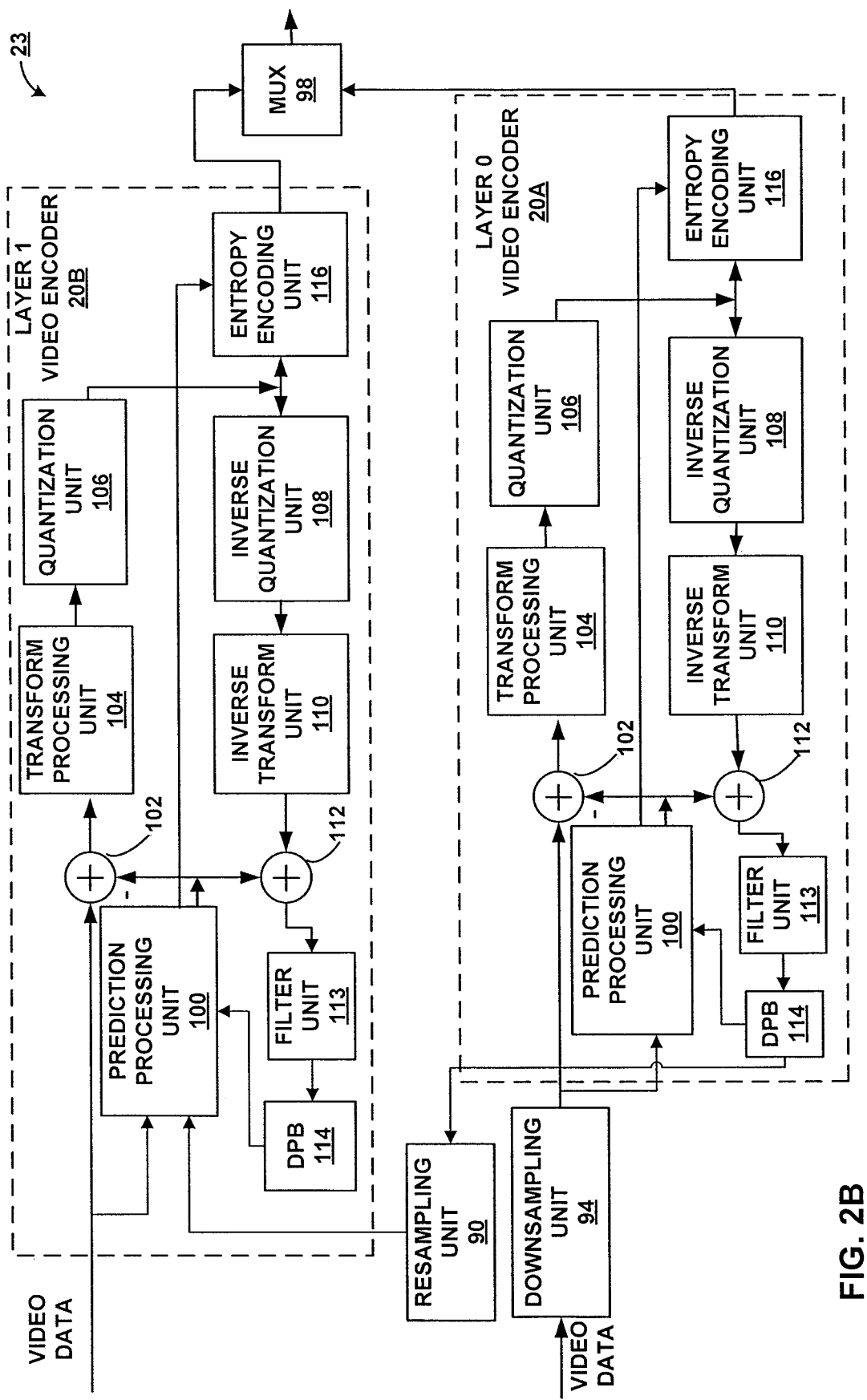
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. The video encoder 23 may be configured to process multi-layer video frames, such as for SHVC and MV-HEVC. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor (or mux) 98. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
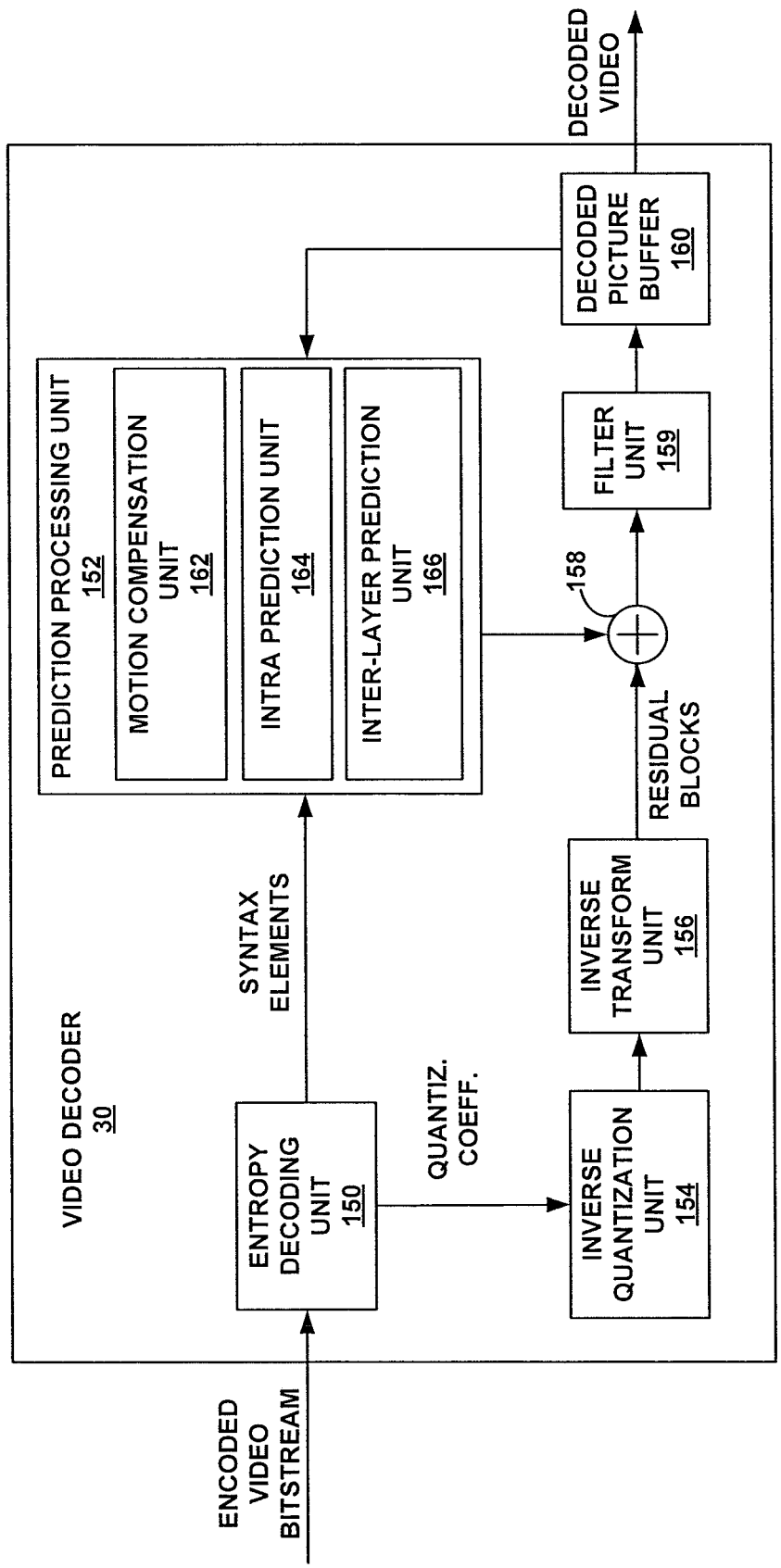
FIG. 3A is a block diagram illustrating an example of a video decoder that may implement techniques in accordance with aspects described in this disclosure.

FIG. 3A is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra-prediction unit 164, and an inter-layer prediction unit 166. In some examples, the video decoder 30 may perform a decoding pass generally reciprocal to the encoding pass described with respect to video encoder 20 of FIG. 2A. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra-prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in SHVC (e.g., a base or reference/enhancement layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Multi-Layer Decoder

Figure 3B:
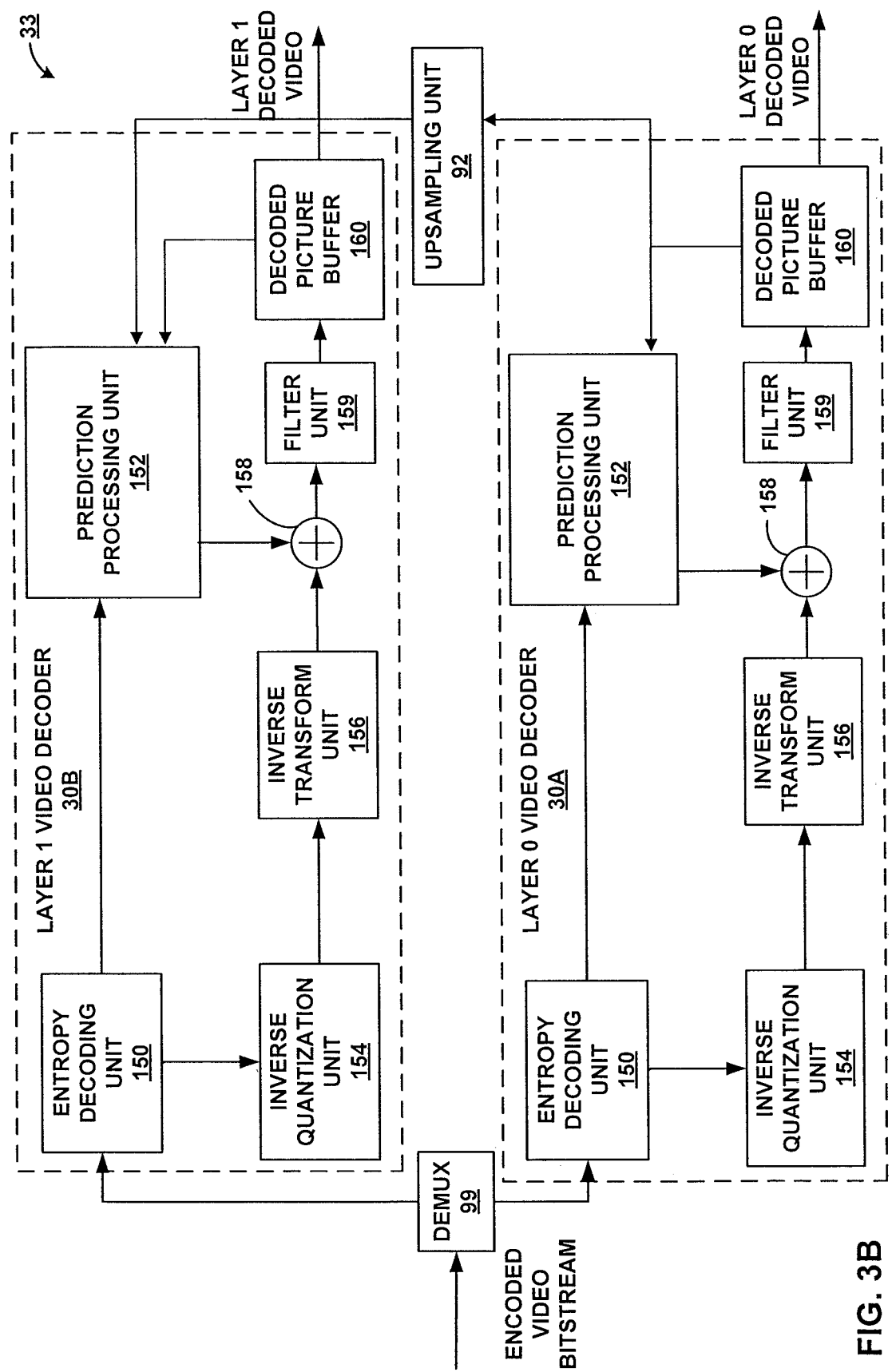
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexor (or demux) 99. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. In such video coding schemes, all pictures that follow a random access point in decoding order, except random access skipped leading (RASL) pictures, can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc.

In some coding schemes, such random access points may be provided by pictures that are referred to as intra random access point (IRAP) pictures. For example, a random access point associated with an enhancement layer IRAP picture in an enhancement layer ("layerA") that is contained in an access unit ("auA") may provide layer-specific random access such that for each reference/enhancement layer ("layerB") of layerA (e.g., a reference layer being a layer that is used to predict layerA) having a random access point associated with a picture contained in an access unit ("auB") that is in layerB and precedes auA in decoding order (or a random access point contained in auA), the pictures in layerA that follow auA in decoding order (including those pictures located in auA), are correctly decodable without needing to decode any pictures in layerA that precede auA.

IRAP pictures may be coded using intra prediction (e.g., coded without referring to other pictures) and/or inter-layer prediction, and may include, for example, instantaneous decoder refresh (IDR) pictures, clean random access (CRA) pictures, and broken link access (BLA) pictures. When there is an IDR picture in the bitstream, all the pictures that precede the IDR picture in decoding order are not used for prediction by pictures that follow the IDR picture. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as RASL pictures. Another type of picture that can follow an IRAP picture in decoding order and precede the IRAP picture in output order is a random access decodable leading (RADL) picture, which may not contain references to any pictures that precede the IRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., having a layer identifier (ID) value of 0) that is an IRAP picture may be referred to as an IRAP access unit.

SEI Messages

Some video coding schemes may include SEI messages. An SEI message may comprise extra information that may be inserted into the bitstream to enhance the data or use of coded pictures within the bitstream. However, as the SEI message is optional, the SEI message does not contain any information that is necessary to decode the coded pictures of the bitstream. For example, the SEI message may comprise metadata, information that may aid in decoding, or hints as to how to best display the data in the bitstream. The SEI messages may be either type prefix or suffix messages.

In conventional single-layer coding schemes (e.g., HEVC), each access unit uniquely contains a single picture for the single layer. Since each access unit of the single-layer coding schemes contains a single picture, the terms "access unit" and "picture" were able to be used interchangeably in the context of single-layer coding schemes. For example, with respect to the utilization and application of SEI messages, it was clear that an SEI message associated with an access unit was also associated with the picture contained within the access unit.

However, the access units of multi-layer coding schemes (e.g., SHVC/MV-HEVC) may include a separate picture for each layer of the bitstream. In other words, in a multi-layer bitstream, a single access unit may contain (i.e., include or comprise) a plurality of pictures which have the same POC value. Since in conventional single-layer coding schemes SEI messages are associated with the single picture of the access unit, these single-layer coding schemes may not have the required semantics to define how an SEI message accurately applies to more than one operation point or layer of a multi-layer coding scheme. This ambiguity relating to the SEI messages in multi-layer coding schemes allows implementations of video encoders or decoders to associate the SEI messages with the pictures from among the possible plurality of pictures within an access unit of a multi-layer coding scheme without restriction. Accordingly, the associations of the SEI messages with pictures, operation points, or layers in multi-layer coding schemes may not always be correct or appropriate. Accordingly, the behavior of these video encoders and decoders with respect to the SEI messages that apply to more than one operation point, layer, and/or picture is not predictable and may vary between different implementations such that these different implementations may not encode/decode a video sequence consistently. For example, in some cases it may be unclear whether the SEI message is to be associated with one picture, a subset of pictures, or all pictures of the corresponding access unit, and the SEI message handled without appropriate semantics may be improperly associated.

Alternatively, or additionally, SEI messages that are not nested may be applied to the operation point that has the temporal ID (Tid) that is the maximum Tid for the bitstream and contains all of the layers of the bitstream.

Accordingly, one object of the present disclosure is to clarify the semantics of the SEI messages such that a scope of the SEI message can be unambiguously associated with one or more pictures of an access unit within a multi-layer coding scheme when the SEI message applies to more than one operation point or layer. Additionally, an object of the present disclosure is to clarify the persistency scopes of the SEI messages, as the persistency scopes of the SEI messages using the semantics of the single-layer coding schemes SEI messages may not be clearly specified as to which picture or pictures of the possible plurality of pictures within the access unit a particular persistency scope applies.

In accordance with the present disclosure, the SEI message implemented in a multi-layer coding scheme may be associated with and/or apply to one or more pictures of an access unit, one or more operation points, and/or one or more layers. When the SEI message applies to more than one operation point or layer, the semantics of the SEI messages may be modified or clarified such that the SEI messages can be unambiguously associated with a specific picture(s) of an access unit, operation point(s), and/or layer(s) within the multi-layer coding scheme. By clarifying the semantics in accordance with the present disclosure, the behavior of video encoders/decoders is more predictable, and thus, the treatment of SEI messages between different implementations of these video encoders/decoders is more consistent than in the multi-layer coding schemes using semantics of single-layer coding schemes. The techniques/schemes of the present disclosure may be "backward" compatible or "downward" compatible such that the techniques/schemes of the present disclosure may be employed by legacy devices employing single-layer video coding schemes. Further, the techniques/schemes of the present disclosure may be utilized with various SEI messages that may be applied to one or more pictures, one or more operation points, and/or one or more layers within the multi-layer access unit.

The SEI messages in multi-layer coding schemes may apply to access units differently depending on the type of SEI message and to what the SEI message applies. For example, the SEI messages may be configured to apply to one layer of a set of layers or one operation point of a set of operation points. An operation point may comprise a list of layers at a range of one or more specific temporal IDs for those layers. For example, the operation point may comprise a list of three layers (layers 0, 1, and 2) at a range of 2 temporal IDs (IDs of 0 and 1), and each of the three layers will be considered (coded) at each of the temporal IDs 0 and 1. Accordingly, the operation point may comprise a subset of bitstreams of the entire bitstream of video information to be decoded/encoded.

For example, when the SEI message for an access unit of a multi-layer bitstream is one of a buffering period SEI message, a picture timing SEI message, and a decoding unit information SEI message and the SEI message applies to a set of operation points (for example, when the SEI message applies to a set of operation points instead of a set of layers), then the semantics of the SEI message may be independently applied to each operation point of the set of operation points to which the SEI message applies. This means that each of the semantics of the SEI message may be applied to each of the operation points of the set of operation points independently, and may not be split among a subset of operation points of the set of operation points. Thus, the semantics of one of the buffering period, the picture timing, and the decoding unit information SEI messages may each apply independently to each of the layers of the list of layers up to the maximum temporal ID for each of the operation points to which the SEI message applies. For example, if a first SEI message applies to a set of operation points and has a payloadType value equal to 0, 1, or 130, then the semantics of the first SEI message independently apply to each operation point of the set of operation points indicated in the first SEI message. Additionally, one or more semantics of the SEI message may be redefined to apply to an appropriate bitstream of each operation point of the set of operation points.

Independently applying the SEI message to the operation points with which the SEI message is associated means that if the SEI message applies to three operation points 0, 1, and 2 (OP 0, 1, and 2), the semantics of the SEI message apply to each of OP 0, OP 1, and OP 2 independently. When modifying or clarifying the semantics of SEI messages as disclosed herein, references in the SHVC/MV-HEVC standard may similarly be modified and/or clarified. For example, when the SEI message independently applies to each operation point in the set of operation points, as described above, the phrase "the current SEI message" in the SHVC/MV-HEVC standard should be read as one of available SEI messages such that anything that applies to that SEI message applies to the current SEI message. Similarly, the phrase "current operation point" in the MV-HEVC may be read to means one of the available operation points and anything that applies to that one operation point of the available operation points applies to the current operation point. The terms "access unit" and "coded video sequence (CVS)" may apply to the access unit as defined by the current operation point (i.e., the BitstreamToDecode). For example, if a bitstream has four layers (layers 0, 1, 2, and 3) but the current operation point only contains three layers (layers 0, 1, and 3), then the "access unit" refers to the access unit containing the pictures of the current operation point, in other words, the pictures of layers 0, 1, and 3. This is because when decoding is done at a particular operation, layers that are not included in the layer set of that operation point will not be included in the BitstreamToDecode.

Figure 4A:
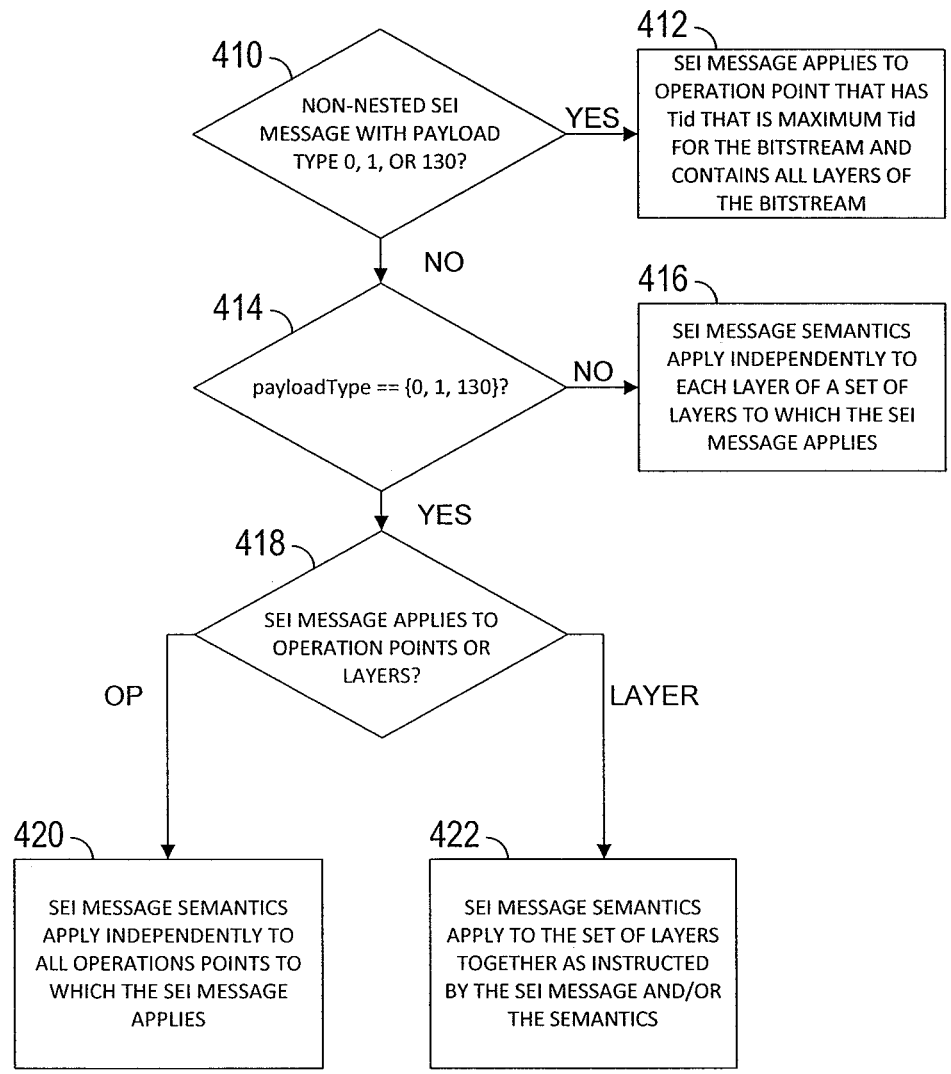
FIG. 4A is a flowchart illustrating the association of semantics of an SEI message with each operation point among the operation points or each layer among the layers.

FIG. 4A is a flowchart 400 illustrating a method for associating semantics of an SEI message independently with each operation point of a set of operation points or each layer of a set of layers, in accordance with an exemplary embodiment. The steps or blocks of the flowchart 400 may be performed by any of the controllers, processors, or other components of the coding and decoding systems described above in relation to FIGS. 1-3B.

At block 410, the method begins by determining whether a current SEI message is a non-nested SEI message having a payload type of 0, 1, or 130 (indicating that the non-nested SEI message is a buffering period, picture timing, or decoding unit information SEI message, respectively). If the SEI message is a non-nested SEI message having the payload type of 0, 1, or 130 (for example, if the SEI message is a non-nested buffering period, picture timing, or decoding unit information SEI message), then the method progresses to block 412. However, if the SEI message is not a non-nested SEI message having a payload type of 0, 1, or 130 (for example, not a non-nested buffering period, picturing timing, or decoding unit information SEI message), then the method progresses to block 414. At block 412, the method applies semantics of the SEI message to the operation point that has the Tid that is a maximum Tid for the bitstream and contains all the layers of the bitstream.

At block 414, the method determines whether the SEI message is one of a buffer period message, a picture timing SEI message, or a decoding unit information SEI message. This determination is made by identifying the value of a field (or semantic) of the SEI message. In some embodiments, this field may be the payloadType field. In some embodiments, the payloadType field may be an integer or other datatype field, wherein the value stored in the field indicates the type of SEI message. For example, when the value of the payloadType field of the SEI message is equal to 0, 1, or 130, then the SEI message may be the buffering period, picture timing, or decoding unit information SEI messages, respectively. In some embodiments, the buffering period, the picture timing, and the decoding unit SEI messages may apply to a set of operation points, the set comprising one or more operation points. If the payloadType field has a value equal to anything except {0, 1, 130}, then the SEI message may apply to one or more operation points or layers and may not be one of a buffering period, picture timing, and decoding unit information SEI message. Accordingly, at block 414, if the payloadType of the SEI message is equal to one of {0, 1, 130}, then the method proceeds to block 418. If the payloadType is not equal to one of {0, 1, 130}, then the method proceeds to block 416. At block 416, the semantics of the SEI message not having a payloadType of one of {0, 1, 130} are each applied independently to each layer of a set of layers to which the SEI message applies.

At block 418, the method determines whether the SEI message applies to operation points or layers. If the SEI message applies to operation points, then the method proceeds to block 420; if the SEI message applies to layers, then the method proceeds to block 422. At block 420, the SEI message semantics are independently applied to all operation points to which the SEI message applies. Thus, if the SEI message is identified as applying to two operation points, then each of the semantics of the SEI message independently applies to each of the two operation points (and the corresponding layers). At block 422, when the SEI message applies to layers (for example, to a single operation point), the SEI message semantics may apply to the set of layers together according to the SEI message and/or the semantics. For example, each SEI message may comprise a field (or semantic) indicating which layer(s) the SEI message applies to. The SEI message semantics may be applied according to those indications.

In some embodiments, the presence and association of particular SEI messages may be dependent upon various conditions. For example, as described above, in some embodiments, syntax and semantics of an SEI message may determine the associations of one or more SEI messages. In some embodiments, information found in a slice header may modify or clarify the presence of SEI messages. For example, a presence of the buffering period SEI message for an operation point may be dependent upon the access unit to which the buffering period SEI message applies. If the access unit has at least one picture that cannot be intentionally discarded without affecting the ability to decode one or more other pictures, then the access unit may have a buffering period SEI message associated with it. In such an instance, the discardable_flag field (a field in the slice header) indicating the discardability of the associated picture may be equal to "1," indicating that the associated picture is not discardable without affecting the decodability of another picture. Alternatively, when the discardable_flag field contains a value of "0," the associated picture may be discarded without affecting the ability to decode another picture. Other SEI messages may have similar or different conditions placed on the presence of the SEI message in association with a given access unit, picture, operation point, or layer.

Figure 4B:
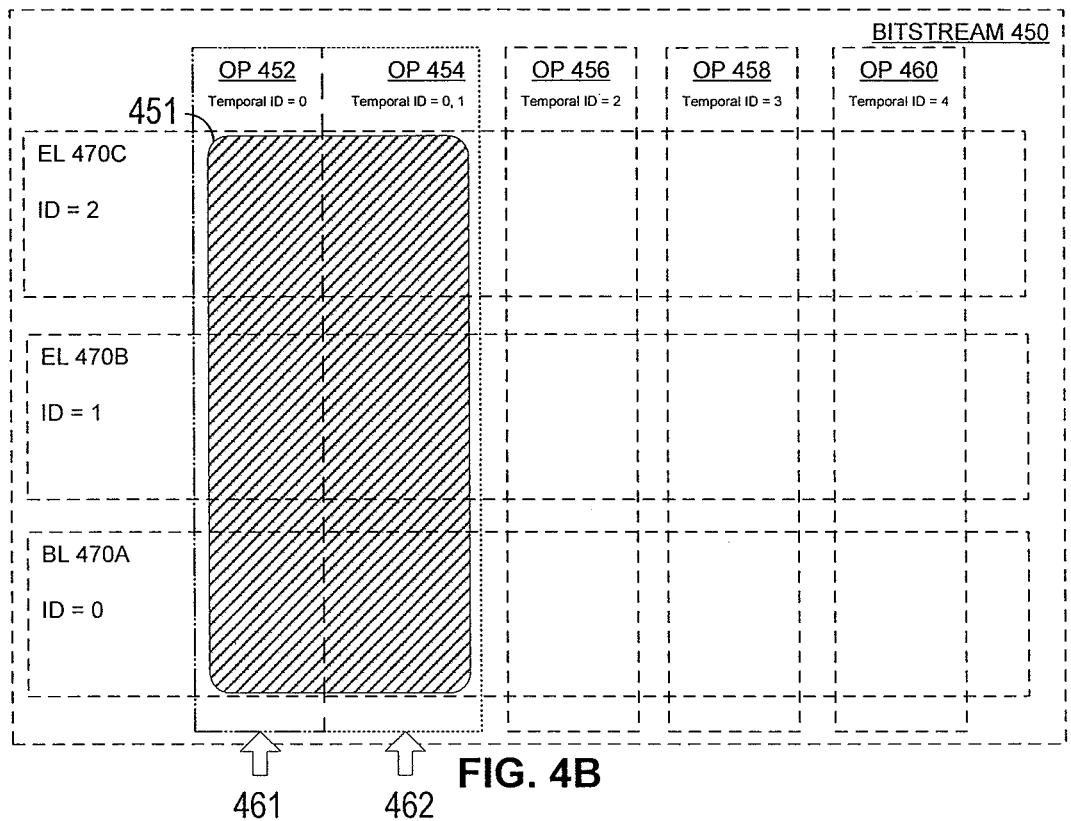
FIG. 4B is a block diagram illustrating the association between a SEI message applying to operation points according to an embodiment of the present disclosure.

FIG. 4B is a block diagram illustrating the association between an SEI message applying to operation points according to an embodiment of the present disclosure. The multi-layer bitstream 450 (also referred to simply as bitstream 450) of FIG. 4B includes a base layer 470A (BL 470A having an identifier "ID" equal to "0"), a first enhancement layer 470B (EL 470B having an identifier "ID" equal to "1"), and a second enhancement layer 470C (EL 470C having an identifier "ID" equal to "2"). Although the bitstream 450 of FIG. 4B is illustrated as containing base layer BL 470A and enhancement layers EL 470B and 470C, the bitstream 450 may include more or fewer enhancement layers. In some embodiments, the enhancement layers may be coded based on the coding of the base layer 470A. In some embodiments, the enhancement layers may comprise different views than the base layer 470A. One example of a multiview bitstream is a three-dimensional (3D) video bitstream including a left eye view layer and a right eye view layer.

Referring back to FIG. 4B, the bitstream 450 includes a plurality of operation points (OPs) 452 to 460. Each operation point corresponds to a temporal moment (having a temporal ID) for the layers BL 470A and EL 470B and 470C. In some embodiments, one or more of the depicted operation points may correspond to a range of temporal moments, for example operation point 454 which comprises temporal IDs 0 and 1. In some embodiments, each of the layers may comprise one or more pictures at the given temporal ID of the corresponding operation point. In some embodiments, an operation point may comprise more than one temporal ID, such as a range of temporal points, though not shown in this figure. In the embodiment of FIG. 4B, an SEI message 451 represents an SEI message applying to a set of one or more operation points (for example, when the SEI message comprises one of the buffering period, picture timing, and decoding unit information SEI messages). As shown by the hatching of the SEI message 451 in conjunction with the description above, the semantics of the SEI message 451 may be independently applied to each operation point of the set of operations points to which the SEI message 451 applies, i.e., operation points OP 452 and OP 454. Thus, as shown by FIG. 4B, the SEI message 451 applies independently to each of the operation point OP 452, as indicated by arrow 461, and operation point OP 454, as indicated by arrow 462.

As described above, the SEI message may apply to one or more layers of a set of layers (for example, instead of a one or more operation points of a set of one or more operation points). Accordingly, the semantics of the SEI message may apply to each layer of the set of layers that has an identifier which corresponds to a value of a target field of the SEI message. For example, if a second SEI message applies to a set of one or more layers, then the semantics of the second SEI message may independently apply to each layer having an identifier value equal to the value of the target field of the second SEI message, wherein each layer belongs to the set of one or more layers.

Figure 4C:
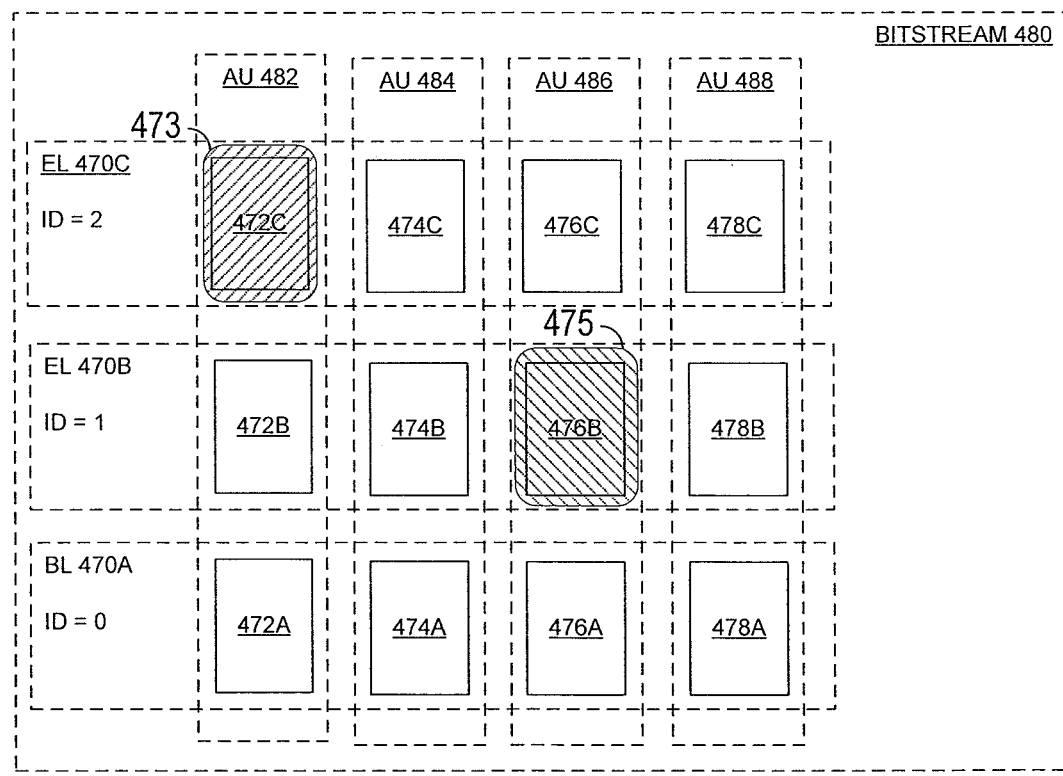
FIG. 4C is a block diagram illustrating the association between a SEI message applying to layers and a plurality of pictures according to an embodiment of the present disclosure.

FIG. 4C is a block diagram illustrating the association between an SEI message applying to layers and a plurality of pictures according to an embodiment of the present disclosure. The multi-layer bitstream 480 (also referred to simply as bitstream 480) of FIG. 4C is similar to that of FIG. 4B except that FIG. 4C comprises pictures and access units instead of operation points associated with each layer, while FIG. 4B comprises temporal identifiers associated with each layer. Accordingly, each AU 482 to 488 includes one picture from each layer. For example, AU 482 includes BL 470A picture 472A, EL 470B picture 472B, and EL 470C picture 472C.

Also shown in FIG. 4C are two SEI messages. The two SEI messages may be recovery point SEI messages, and thus may have a payloadType value of "6." Thus, the two recovery point SEI messages may apply to at least one layer of a set of layers, and the two recovery point SEI messages may each include a targetLayerId semantic comprising values of "1" and "2" respectively. Thus, the recovery point SEI messages may each respectively apply to the particular layers having the nuh_layer_id value of "1" and "2." In the embodiment illustrated by FIG. 4C, picture 472C may be indicated as the recovery point picture of the recovery point SEI message having the targetLayerId value "2" while the picture 476B may be indicated as the recovery point picture of the recovery point SEI message having the targetLayerId value "1."

In some embodiments, when the SEI message is one of a pan-scan rectangle, a progressive refinement segment start, a film grain characteristics, a tone mapping information, a frame packing arrangement, and a display orientation SEI message, the semantics of the SEI message relating to the persistence scope may be clarified to be layer specific. For example, the SEI messages listed above may include syntax specifying the persistence for the current layer. The syntax for each listed SEI message may include a persistence_flag value (i.e., a film_grain_characteristics_persistence_flag or a tone_map_persistence_flag). The persistence flag syntax may indicate persistence for the current layer until a new CVS begins, until the current bitstream ends, or until another picture in the current layer having another SEI message of the same type that applies to the current layer begins to be decoded. Accordingly, the semantics of the corresponding SEI message may apply only for the current layer or a specified layer(s), as indicated by the SEI message. For example, with reference to the SEI messages discussed above, when one of the SEI messages is indicated as applying to the second layer (for example, the value of the targetLayerId is 2), then the semantics of that SEI message (for example, a film_grain_characteristics_cancel_flag and film_grain_characteristics_persistence_flag of a film grain characteristics SEI message of the film grain characteristics SEI message) may apply to the second layer, and thus may specify that the associated persistence related semantics apply to the that layer (i.e., layer 2). These persistence related semantics may apply until a new CVS begins, the bitstream ends, or another picture in layer 2 has a film grain characteristics SEI message applicable to layer 2 and having a greater POC value begins to be decoded.

In some embodiments, a temporal sub-layer zero index SEI message may provide information that can be used to assist a decoder to detect missing coded pictures. The temporal sub-layer zero index SEI may provide an index to a picture with Tid equal to 0 so that the decoder may be aware if it sees a picture with Tid equal to 0 but its index has a gap from a previous picture that has Tid equal to 0. The gap usually occurs if there is picture lost. Thus this SEI will be able to help the decoder to understand that there is a lost picture. However, there may be a problem when a picture with Tid equal to 0 is also a discardable picture (i.e., its discardable_flag is equal to 0). When the discardable picture has Tid equal to 0 and is discarded (removed) from the bitstream (by an entity—e.g., smart router) before reaching the decoder, the decoder may mistakenly think there is a lost picture where it was not actually lost but rather intentionally removed.

The temporal sub-layer zero index SEI message may include a syntax element temporal_sub_layer_zero_idx that indicates the temporal sub-layer zero index for the current picture when the current picture has a temporal ID (Tid) equal to zero. Alternatively, the temporal_sub_layer_zero_idx syntax element may indicate the temporal sub-layer zero index for the preceding picture in the current layer in decoding order with a Tid equal to 0. In some embodiments, the semantics of the temporal sub-layer zero index SEI message may be clarified to consider a value of a discardable_flag element of the slice header, for example, of a picture. For example, the temporal_sub_layer_zero_idx element may be constrained such that the value of the element is only increased when the current picture is an anchor picture that cannot be discarded intentionally without affecting the ability to decode another picture. For example, if the current picture has a Tid greater than 0 or the discardable_flag value of the current picture is 0, indicating the current picture is discardable, then the temporal_sub_layer_zero_idx value will not be incremented. Accordingly, when modifying or assigning a value to the temporal_sub_layer_zero_idx element, the semantics of the temporal sub-layer zero index SEI message are modified to consider the value of the discardable_flag element of the slice header for associated pictures.

Sequence Parameter Sets (SPS)

Some video coding schemes may further include parameter sets such as an SPS. A parameter set may carry certain common control parameters to the decoder as they pertain to one or more coded slices. Having the parameters contained within the parameter set transmitted independently of the coded slices may improve efficiency, as information that applies to multiple coded slices may be sent a single time as opposed to being sent individually for each coded slice. In some embodiments, the SPS may comprise one or more parameters that are common to a video sequence. For example, the SPS may comprise information regarding the size of a video frame or decoder constraints, such as the maximum number of reference frames. Additionally, each SPS may comprise a unique identifier identified within the SPS. The SP S may remain "inactive" until activated by a PPS that is activated, effectively, an instantaneous decoder refresh (IDR) access unit. The SPS may remain active until processing of the coded video sequence to which the SPS applies is completed.

In conventional single-layer coding schemes (e.g., HEVC), a video sequence contains a sequence of access units that each uniquely contain a single picture. Since each access unit of the video sequence contains a single picture, the SPS associated with the video sequence is known to be associated with the single pictures within the access units. For example, an SPS0 is sent at the beginning of a video sequence. The video sequence may comprise an IDR0 that activates SPS0, followed by multiple slices. The decoder may use the parameters of SPS0 until a subsequent IDR1 activates a subsequently communicated SPS1. Thus, the decoder uses the parameters of SPS0 to decode for the multiple slices between the IDR0 and the IDR1. Additionally, in conventional single layer schemes, only one SPS may be signaled in an active parameter set.

However, as discussed above, the access units of multi-layer coding schemes may include a separate picture for each layer of the bitstream. In other words, as also discussed above, in a multi-layer bitstream, a single access unit may contain (i.e., include or comprise) a plurality of pictures in a plurality of layers. Since in conventional single-layer coding schemes SPS are associated with the single layer having the single picture, these single-layer coding schemes may not have the required semantics to define how one or more SPS accurately relate to one or more layers among the possible plurality of layers within a multi-layer coding scheme. Thus, a problem or ambiguity may develop when the number of SPS is less than the number of layers in the bitstream or when the number of SPS is greater than the number of layers in the bitstream, as the association of SPS to the layers may be unclear.

This ambiguity relating to the SPS in conventional schemes allows implementations of video encoders or decoders to associate multiple SPS with a layer from among the possible plurality of layers within an access unit of a multi-layer coding scheme without restriction. Accordingly, the behavior of these video encoders and decoders with respect to the multiple SPS is not predictable and may vary between different implementations such that these different implementations may not encode/decode a video sequence consistently. As such, one other object of the present disclosure is to introduce a mechanism to map or signal how multiple SPS should be unambiguously associated with multiple layers in an active parameter sets SEI message within a multi-layer coding scheme. Additionally, the constraints on the number of SPS that can be signaled in an active parameter set SEI message may be loosened to allow more than one SPS to be signaled in a single active parameter sets SEI message.

The mechanism for signaling the manner in which multiple SPS should be unambiguously associated with multiple layers by an active parameter sets SEI message may indicate the layer to which each SPS should be applied. The mechanism may assign a specific layer to each specific SPS such that the SPS is understood to be associated with the specific layer. In some embodiments, the mechanism may assign a specific SPS to each specific layer such that the layer is understood to be associated with the specific SPS. Within the mechanism, or in addition to the mechanism, the existing constraints limiting the number of SPS signaled in an active parameter set SEI message may be removed so as to allow multiple SPS to be signaled by a single active parameter set SEI message.

In some embodiments, the mechanism may comprise instituting a loop association such that for each specific SPS, a particular layer is assigned to the SPS. For example, in the active parameter sets SEI message discussed above, a new semantic may be added representing a field that includes a value indicating the layer to which a particular SPS applies. Within the active parameter sets SEI message, a first SPS having an identifier will be assigned a specific layer as indicated in the new semantic (i.e., target_nuh_layer_id[i]). Thus, for each SPS identified by the active parameter sets SEI message, a particular layer will be assigned as the associated layer, in the loop association manner, until each SPS has a layer assigned to it. Alternatively, or additionally, the active parameter sets SEI message (or a newly defined SEI or other message) may associate each layer of a plurality of layers with one or more SPS. Similar to that described above, an association loop may assign each layer one or more specific SPS with a loop association fashion until each layer has one or more SPS assigned to it.

Figure 5:
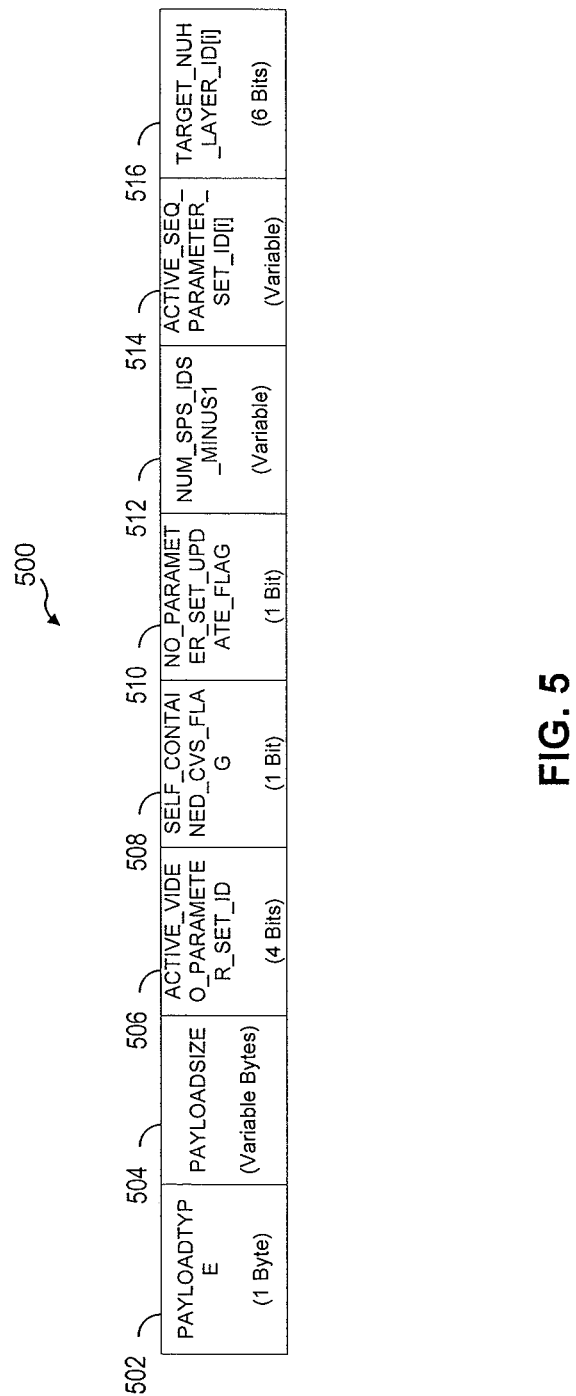
FIG. 5 shows syntax that may be used for communicating active parameter sets SEI message semantics.

FIG. 5 shows a syntax 500 that may be used to communicate active parameter sets SEI message semantics. This syntax 500 may be communicated in the SEI message of an access unit or picture and may be intended to provide necessary information regarding the type of SEI message, the size of the SEI message, and various other aspects of the SEI message semantics. Though the current FIG. 5 depicts many elements of the active parameter sets SEI message, the syntax 500 may include more or fewer components than illustrated in FIG. 5. Additionally, or alternatively, the same or similar syntaxes to syntax 500 may be used for communicating SEI message semantics for other types of SEI messages (for example picturing timing, decoding unit information, film grain characteristics, pictures snapshot, and scene information SEI messages, among others). Accordingly, not all of the semantics (or fields) of the syntax 500 may be defined herein. Such lack of definition shall not be construed as being representative of importance of function. As shown, the syntax 500 includes a sampling of fields (or semantics) useful for describing prominent features of implementations within the scope of the claims and may include one or more additional fields that are not shown or may include one or more fields that may not be utilized in all embodiments.

The syntax 500 may include the semantics payloadType 502 and payloadSize 504, as may all other syntaxes of SEI messages. PayloadType 502 has a length of one byte, and may include values indicating the type of SEI message with which the syntax 500 is associated. For example, the payloadType 502 may include a value of 0 or 1 indicating a buffering period or a picture timing SEI message. With a size of one byte, the payloadType 502 may indicate one of 256 different SEI messages. The syntax 500 further includes a payload size 504 semantic. The payloadSize 504 may be of variable size specified in bytes and may be equal to the number of raw byte sequence payload bytes in the SEI message payload.

The syntax 500 further includes a semantic active_video_parameter_set_id 506 having of a length of four bits. The active_video_parameter_set_id 506 may indicate a value of identifying a video parameter set (VPS) that is referred to by units associated with the SEI message. In some embodiments, the value of active_video_parameter_set_id 506 may be in the range of 0 to 15, inclusive. The syntax 500 further includes a semantic self- _contained_cvs_flag 508 having a length of one bit and a no_parameter_set_update_flag 510 having a length of one bit. The self_contained_cvs_flag 508 indicates that each parameters set referenced by a unit precedes any unit that references the parameters set, while the no_parameter_set_update_flag 510 indicates that no parameter set needs to be updated. The syntax 500 further includes a num_sps_ids_minus1 512 semantic having a length of a variable datatype and indicating the number of SPSs that are referred to by units of the access unit associated with the active parameter sets SEI message. Additionally, a semantic active_seq_parameter_set_id[i] 514 is included in the syntax 500. The active_seq_parameter_set_id[i] 514 may indicate the value identifying the SPS that is referred to by the units having a nuh_layer_id in the range of target_nuh_layer_id[i] of the access unit associated with the SEI message. Finally, the syntax 500 as shown may include a target_nuh_layer_id[i] 516 semantic that may be configured to specify the targetLayerId associated with the active_seq_parameter_set_id[i]. The mechanism referred to above may make particular use of the active_seq_parameter_set_id[i] and target_nuh_layer_id[i] in the association loop.

Recovery Point SEI Messages and POC Derivations

In some video coding schemes, it may be possible to start decoding the bitstream between IRAP pictures. This may enable a faster return to a properly decoded video stream when, for example, a portion of the bitstream is lost during transmission or during decoding, or for faster initiation of the decoding a live-streaming video. However, when initiating the decoding of a video stream at a random access point between IRAP pictures, the decoded video stream may not have an acceptable quality for display due to the reliance of the decoding process on pictures that precede the random access point in decoding order.

As previously mentioned, some video coding schemes include a recovery point SEI message which may assist a decoder in the determination of when the decoding process will produce acceptable pictures for display. When the decoder initiates a random access or reinitiates decoding after a broken link, the decoder may be able to determine when the decoded pictures are acceptable for display based on a recovery point SEI message included in the bitstream. The recovery point SEI message specifies a recovery point in the decoded picture output order which indicates that, when the decoding processes is initiated from the access unit containing the recovery point SEI message, all decoded pictures decoded at or subsequent to the recovery point in output order may be correct or approximately correct in content. Such recovery point SEI messages do not require that the decoded pictures produced based on the decoding of the bitstream after a random access and/or before the picture associated with the recovery point are in correct order for the pictures decoded after the recovery point to have correct or approximately correct decoded content. Further, recovery point SEI messages may not require that pictures that are referenced by the decoding of the bitstream after a random access and/or before the picture associated with the recovery point are available.

In conventional single-layer coding schemes (e.g., HEVC), each access unit uniquely contains a single picture. Since each access unit contains a single picture, the terms "access unit" and "picture" were able to be used interchangeably in the context of single-layer coding schemes, for example, with respect to the utilization of recovery point SEI messages. However, the access units of multi-layer coding schemes may include a separate picture for each layer of the bitstream. In other words, in a multi-layer bitstream, a single access unit may contain (i.e., include or comprise) a plurality of pictures. Since in conventional single-layer coding schemes recovery point SEI messages are associated with an access unit, these single-layer coding schemes may not have the required semantics to define how a recovery point SEI message accurately relates to one or more pictures among a possible plurality of pictures within an access unit of a multi-layer coding scheme. This ambiguity relating to recovery point SEI messages in conventional schemes allows implementations of video encoders or decoders to associate the recovery point SEI messages with the pictures from among the possible plurality of pictures within an access unit of a multi-layer coding scheme without restriction. Accordingly, the behavior of these video encoders and decoders with respect to recovery point SEI messages is not predictable and may vary between different implementations such that these different implementations may not encode/decode a video sequence consistently.

Additionally, in single-layer coding schemes, an access unit comprising a recovery point SEI message may reset the value of the POC to zero at the recovery point SEI message. Additionally, other values of the picture or decoder may be reset or signaled to be set to a specified value based on the recovery point SEI message. For example, a value of a previous picture order count may be reset to 0 or a poc_msb semantic (most significant bit of the picture order count) may also be set to 0 at the recovery point SEI message.

In SHVC/MV-HEVC, the POC for a current picture having the recovery point SEI message may be calculated based on the poc_msb signaled in the slice header for the current picture. Generally, when not set by the recovery point SEI message, the poc_msb value for the current picture may be based on the poc_msb of the previous picture. Thus, when the poc_msb is signaled in the slice header of the current picture, the poc_msb of the current picture may be set to the signaled poc_msb. However, since the poc_msb of the picture associated with the recovery point SEI message is set to zero, when the poc_msb of current picture (i.e., following the picture, in decoding order, associated with the recovery point SEI message which had the poc_msb set to zero) shall be set according to the signaled value, there is problem because the signaled value and the derived value may not match.

In multi-layer coding schemes, there is a mechanism for signaling the poc_msb value. The poc_msb values of pictures may be signaled in slice headers. In some embodiments, under such a mechanism, when decoding a current picture having a signaled poc_msb value in the slice header, the poc_msb value for the current picture should not be calculated based on earlier picture semantics, but rather, the value in the poc_msb signaled in the slice header should just be used as the poc_msb value for the current picture. A problem occurs because, under the single-layer coding scheme, a random access to a picture having a recovery point SEI message resets the poc_msb (set the poc_msb to 0) and the POC. However, in the multi-layer coding schemes, if the poc_msb for the current picture is simply set to zero as designated by existing coding schemes, but the subsequent picture has a poc_msb value signaled (as a value other than 0) in the slice header, a conflict is generated, because the subsequent pictures cannot correctly derive the poc_msb value due to the signaled poc_msb value and the preceding zero value. For example, a picture, picA, is in the same layer as the picture associated with the recovery point SEI message and follows the picture associated with the recovery point SEI message in decoding order. The picA has a signaled picture order count derivation value (for example poc_msb_val). Accordingly, the derivation of the POC of the picA may be unclear or incorrect.

Thus, when decoding a picture having the recovery point SEI message, the POC semantics should not be simply reset to 0 or signaled to another value. Instead, the semantics of the recovery point SEI message should be modified to provide for a derivation of a value of the POC of the picture that is associated with the recovery point SEI message when the decoding process starts from a layer that is associated with the recovery point SEI message. In some embodiments, this may involve inferring one or more POC semantics values. Additionally, the semantics of the recovery point SEI message may be modified to introduce constraints governing the presence of recovery point SEI messages in an access unit or the association of a recovery point SEI message with a picture. Accordingly, in multi-layer coding schemes, when a random access is performed and decoding starts from the access unit containing the recovery point SEI message, the poc_msb value may not be set to zero, but rather the poc_msb value may be recalculated based on the mechanism defined in the standard for calculating the poc_msb. Thus, when random access is performed and decoding starts from the access unit containing the recovery point SEI message, the decoder may operate as if the associated access unit was the first access unit in the bitstream in decoding order. Additionally, if the semantic indicating that the poc_msb value is present for the current picture is equal to 1 (poc_msb_val_present_flag of the current picture=1), then the variable PicOrderCntMsb may be calculated to be poc_msb_val*MaxPicOrderCntLsb. If the poc_msb_val_present_flag=0, then the PrevPicOrderCnt[nuh_layer_id] is set to 0.

Alternatively, or additionally, various constraints may be put in place to govern the presence of a recovery point SEI message in an access unit or the association of a recovery point SEI message with a picture. For example, in some embodiments, the following conditions may be required to be met for a recovery point SEI message to apply to a current layer:

When a layer, layerA, has at least one reference layer and one or more pictures belonging to layerA and its at least one reference layer in a particular access unit have semantic indicating that the poc_msb value is present in the SEI header equal to 0 (for example, poc_msb_val_present_flag equal to 0) and have a semantic indicating that the POC reset indicator is equal to 0 (for example, poc_reset_idc equal to 0), then that particular access unit may not contain a recovery point SEI message that applies to a set of layers containing only the layerA and its reference layers.

Alternatively, or additionally, when a layer, layerA, has a layer id semantic greater than zero (for example, nuh_layer_id>0) and a picture of layerA in a particular access unit has a semantic indicating that the poc_msb value is present in the SEI header equal to 0 (for example, poc_msb_val_present_flag equal to 0) and has a semantic indicating that the POC reset indicator is equal to 0 (for example, poc_reset_idc equal to 0), then that access unit may not contain a recovery point SEI message that applies to only layerA.

Alternatively, or additionally, when a picture, picA, belonging to a layer having a layer id semantic equal to 0 (for example, nuh_layer_id=0) and any picture that succeeds, in decoding order, the picture picA and precedes, in decoding order, the next IRAP picture with NoRaslOutputFlag equal to 1 and layer id equal to 0, including picA and the next IRAP picture, has a slice_segment_header_extension_length greater than 0, poc_msb_val_present_flag equal to 0 and poc_reset_idc equal to 0, then the access unit containing picA may not contain a recovery point SEI message that applies only to the layer having layer id equal to 0.

Alternatively, the following conditions may be added:

If the recovery point SEI message is nested and applies to more than one layer, then all pictures of the layers to which the recovery point SEI message applies to in the current access unit may have a semantic indicating that the poc_msb value is present in the SEI header equal to 1 (for example, poc_msb_val_present_flag equal to 1) or have a semantic indicating that the POC reset indicator is equal to 0 (for example, poc_reset_idc equal to 0).

Otherwise, if the recovery point SEI message (nested or non-nested) only applies to a layer that has layer id greater than 0 (nuh_layer_id>0), then the picture of the layer that belongs to the current access unit may have a semantic indicating that the poc_msb value is present in the SEI header equal to 1 (for example, poc_msb_val_present_flag equal to 1) or may have a semantic indicating that the POC reset indicator is equal to 0 (for example, poc_reset_idc equal to 0).

Otherwise (the recovery point SEI message only applies to the layer with layer id equal to 0 (nuh_layer_id=0)), when there is at least one picture that succeeds, in decoding order, the current picture and precedes, in decoding order, the next IRAP picture with NoRaslOutputFlag equal to 1, including the current picture and the next IRAP picture, with the value of the syntax element slice_segment_header_extension_length greater than 0, the current picture of the layer that belongs to the current access unit may have a semantic indicating that the poc_msb value is present in the SEI header equal to 1 (for example, poc_msb_val_present_flag equal to 1) or may have a semantic indicating that the POC reset indicator is equal to 0 (for example, poc_reset_idc equal to 0.

Alternatively, the following constraints may be added:

If there is any picture in any of the layers to which the current SEI message applies in an access unit that follows, in decoding order, the current access unit has poc_msb_val_present_flag present, each picture in any of the layers to which the current SEI messages applies may have a semantic indicating that the poc_msb value is present in the SEI header equal to 1 (for example, poc_msb_val_present_flag equal to 1) or may have a semantic indicating that the POC reset indicator is equal to 0 (for example, poc_reset_idc equal to 0.

Alternatively, the following constraints may be applied:

If there is any picture in any of the layers to which the current SEI message applies in an access unit following the current access unit in decoding order has poc_msb_val_present_flag present, each picture in any of the layers the current SEI messages applies may have poc_msb_val_present_flag equal to 1.

Alternatively, the following constraints may be applied:

If the current SEI applies to only one layer with layer id greater than 0 (nuh_layer_id>0), the current picture may a have semantic indicating that the poc_msb value is present in the SEI header equal to 1 (for example, poc_msb_val_present_flag equal to 1).

Else if the current SEI applies to more than one layer, including the base layer, all pictures in the current access unit in all layers to which the recovery point SEI applies may have a semantic indicating that the poc_msb value is present in the SEI header equal to 1 (for example, poc_msb_val_present_flag equal to 1).

Else if slice segment header extension length is greater than 0 and a semantic indicating that the poc_msb value is present in the SEI header is equal to 0 (for example, poc_msb_val_present_flag equal to 0) for the current picture, the recovery point SEI message may not be present.

Region Refresh Information SEI Messages

Some video coding schemes further include region refresh information SEI messages (also referred to as region refresh SEI messages). A region refresh SEI message, which is associated with a recovery point SEI message, indicates whether regions (e.g., slice segments) of a current picture, that the current region refresh SEI message applies/corresponds to, belong to a refreshed region (or a non-refreshed region) of the current picture. In other words, a region refresh SEI includes information that indicates whether individual slices of a corresponding picture are correct or approximately correct in content after decoding. The region refresh SEI message is used in combination with the recovery point SEI message. The region refresh SEI messages states that if you start decoding from the picture having the recovery point SEI message, starting from the next picture after the picture having the recovery point SEI message until the recovery point picture, the number of regions that are correctly decoded for each picture between the recovery point SEI message picture and the recovery point picture will change until everything is correctly decoded (or substantially or approximately correctly decoded) at the recovery point picture.

As described above, in conventional video coding schemes an access unit is uniquely associated with a picture. As such, in these conventional schemes, region refresh information SEI messages are associated with an access unit, and thus, uniquely associated with a picture. Furthermore, in conventional coding schemes, inter-layer constraints and/or predictions may not be a concern because there may not be pictures in other layers to be associated with. However, in multi-layer coding schemes an access unit may contain more than one picture. Furthermore, the region refresh SEI message associated with the recovery point SEI message and prediction constraints used to define semantics of the region refresh SEI message may not account for inter-layer prediction constraints. This may cause a problem in multi-layer HEVC (e.g., SHVC/MV-HEVC).

When decoding layers that are not the base layer, inter-layer prediction may be considered, meaning that a picture that is in a layer other than the base layer may rely on a corresponding picture, and that reliance may be considered in determining if a region is refreshed. For example, a region of a certain picture in a reference layer may be refreshed when the certain picture relies on a corresponding picture in the base layer and both the corresponding picture (or at least the corresponding region of the corresponding picture) in the base layer and the certain picture have been refreshed. Thus, any picture or region referenced by another picture or region that is deemed to be refreshed may also have been refreshed.

The semantics of conventional video coding schemes do not necessarily account for such inter-layer dependencies or prediction constraints. Accordingly, another object of the present disclosure is to clarify the semantics of region refresh information SEI messages such that inter-layer dependencies and/or prediction constraints are considered when identifying refreshed regions.

In multi-layer coding schemes, region refresh information SEI messages (associated with a recovery point SEI message) providing region refresh information for pictures in reference layers may account for inter-layer and intra-layer prediction constraints. For example, in some embodiments, if a region of a picture is declared refreshed, that region may either have been intra-predicted, meaning it was decoded without dependency to other regions, or it is inter-predicted, meaning it was decoded by depending on other regions that were already refreshed themselves.

For example, decoding a first picture in a reference layer (or any layer) may rely on information from one or more second pictures in a base layer. In some embodiments, the second picture on which the first picture relies is in the same access unit or a different access unit as the first picture. Thus, when a region refresh SEI message indicates whether one or more regions of the first picture is refreshed, the region refresh SEI message should consider the fact that the first picture relies on information from one or more second pictures. If the one or more regions of the first picture indicated by the region refresh SEI message as being refreshed rely on one or more other regions of the second picture(s) that have not been refreshed, then the region refresh information of the first picture may not be accurate. This is because if the information on which the first picture relies is not refreshed, then the first picture may not be deemed properly refreshed.

In some embodiments, the region refresh SEI message may be configured to account for any inter-layer predictions or constraints of pictures to which it applies. For example, the region refresh SEI message may identify a list of target layers (for example, a list of the layers to which the region refresh SEI message applies) and may specify any relationships (or associations) between the region refresh SEI message and a recovery point SEI message. In some embodiments, the region refresh SEI message may also define some conformance constraints regarding the use of inter-layer prediction for pictures that are associated with the region refresh SEI message. In some embodiments, the region refresh SEI message may be associated with or related to a recovery point SEI message that applies to a layer that is included in the list of target layers of the refresh region SEI message. The region refresh SEI message may alternatively be associated with a recovery point SEI message that applies to the list of target layers and that does not apply to any other layer or the region refresh SEI message may be associated with any recovery point SEI message that applies to the target layers.

In some embodiments, the list of target layers described above may be derived as follows: if the region refresh information SEI message applies to the current layer and all the reference layers, then the list of target layers may contain the layer id (nuh_layer_id) of the current layer and all of the reference layers. Otherwise, the list of target layers may contain the layer id (nuh_layer_id) of the current layer.

Figure 6:
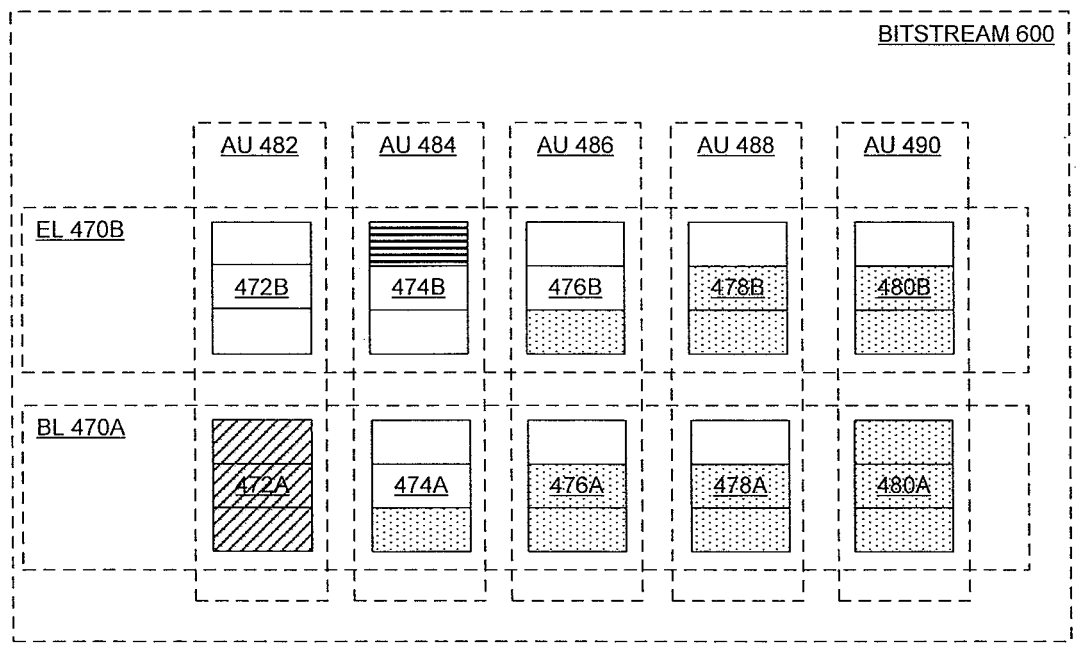
FIG. 6 is a block diagram illustrating the association between one or more region refresh SEI messages and one or more pictures of a multi-layer bitstream according to an embodiment of the present disclosure.

FIG. 6 is a block diagram illustrating the association between one or more region refresh SEI messages and one or more pictures of a multi-layer bitstream according to an embodiment of the present disclosure. FIG. 6 includes a multi-layer bitstream 600 (also referred to simply as bitstream 600) which is similar to the bitstream 480 in connection with FIG. 4C. Shown in FIG. 6 is a first recovery point SEI message associated with BL 472A and the corresponding recovery point is associated with BL 480A. In FIG. 6, the cross-hatching is intended to indicate that the corresponding pictures for each of the recovery point SEI messages are associated with the respective recovery point SEI messages and one or more respective region refresh SEI messages. A plurality of pictures following and in a same layer as a picture associated with a recovery point SEI message may be generally referred to as gradual decoding refresh (GDR) pictures. A GDR picture may be associated with a GDR picture set that includes pictures starting from the picture associated with the recovery point SEI message to the last picture in the GDR picture set in output order. The GDR picture set is associated with a corresponding recovery point SEI message. Further, a region refresh SEI message may be associated with a GDR picture. In FIG. 6, each of BL pictures 472A to 480A in the base layer 470A is illustrated as including three separate slices of content, while each of EL pictures 472B to 480B in the enhancement layer 470B is also illustrated as including three separate slices of content. However, in other embodiments, the pictures of the base layer BL 470A and/or enhancement layer EL 470B, respectively, may be divided into more or fewer slices than shown in FIG. 6. In some implementations of the present disclosure, a region refresh SEI message is only associated with a picture when the picture is included in a GDR picture set. The slices of the BL pictures 472A to 480A in the base layer 470A and in the EL pictures 472B to 480B in the enhancement layer 470B will be referred to as top, middle, and bottom slices herein to refer to the corresponding slices based on their orientation in the figure.

The region refresh SEI message of BL picture 474A of FIG. 6 indicates that the bottom slice of the BL picture 474A will be correct or approximately correct in decoded content by BL picture 474A as illustrated by the dotted hatching. Similarly, the region refresh SEI message of BL picture 476A indicates that the corresponding middle slice (i.e., the middle slice of BL picture 476A) will be correct or approximately correct in content by BL picture 476A. Similarly, the region refresh SEI message of BL picture 480A indicates that the top slice of BL picture 480B will be correct or approximately correct in content by BL picture 480A. As such, the region refresh information SEI messages includes information further defining when each of the slices in the associated picture will be correct or approximately correct in decoded content when random access begins at or prior to a picture associated with the corresponding recovery point SEI message (e.g. the picture associated with the recovery point SEI message that is associated with the GDR picture set). Additionally, since the pictures 474A-480A are pictures on the base layer BL 470A, the region refresh information of the SEI messages may not need to consider any inter-layer prediction constraints or any reliance of these pictures on other pictures. Thus, the region recovery information of the region recovery SEI messages may be accepted as being correct and accurate.

However, the region refresh information SEI message of EL picture 476B indicating that the bottom slice will be correct or approximately correct in content by EL picture 476B may need to consider inter-layer prediction constraints because the EL picture 476B bottom slice may be refreshed only when the corresponding region of the corresponding picture of the base layer BL 476A is refreshed. Thus, as shown in FIG. 6, since the corresponding bottom slice of the corresponding picture BL 476A is refreshed, the region refresh information SEI message of EL picture 476B may be deemed to be correct. However, the region refresh information SEI message of EL picture 474B indicating that the top slice will be correct or approximately correct in content by EL picture 474B may be deemed to be incorrect, as the corresponding top slice of the corresponding picture BL 474A is not indicated as being refreshed by the corresponding region refresh information SEI message of BL picture 474A. Thus, the top slice of EL picture 474B may not be correct or approximately correct in content by EL 474B.

Figure 7:
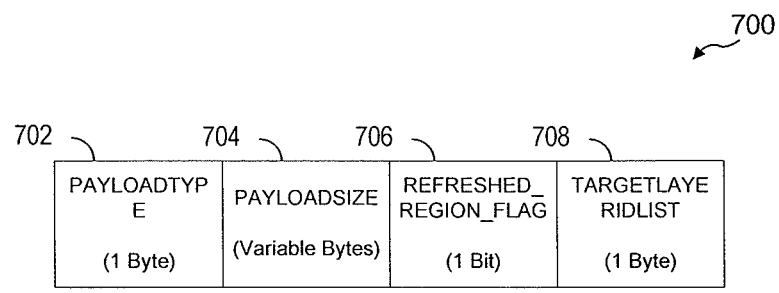
FIG. 7 shows syntax that may be used to communicate region refresh information SEI message semantics.

FIG. 7 shows a syntax 700 that may be used to communicate region refresh information SEI message semantics. This syntax 700 may be communicated in the SEI message of an access unit or picture and may be intended to provide necessary information regarding the type of SEI message, the size of the SEI message, and various other aspects of the SEI message semantics. Though the current FIG. 7 depicts many elements of the region refresh information SEI message, the syntax 700 may include more or fewer components than illustrated in FIG. 7. Additionally, or alternatively, the same or similar syntaxes to syntax 700 may be used for communicating SEI message semantics for other types of SEI messages (for example picturing timing, decoding unit information, film grain characteristics, pictures snapshot, and scene information SEI messages, among others). Accordingly, not all of the semantics (or fields) of the syntax 700 may be defined herein. Such lack of definition shall not be construed as being representative of importance of function. As shown, the syntax 700 includes a sampling of fields (or semantics) useful for describing prominent features of implementations within the scope of the claims and may include one or more additional fields that are not shown or may include one or more fields that may not be utilized in all embodiments.

The syntax 700 may include the semantics payloadType 702 and payloadSize 704, as may all other syntaxes of SEI messages, as described above. PayloadType 702 has a length of one byte, and may include values indicating the type of SEI message with which the syntax 700 is associated. For example, the payloadType 702 may include a value of 0 or 1 indicating a buffering period or a picture timing SEI message, respectively. With a size of one byte, the payloadType 702 may indicate one of 256 different SEI messages. The syntax 700 further includes a payload size 704 semantic. The payloadSize 704 may be of variable size specified in bytes and may be equal to the number of raw byte sequence payload bytes in the SEI message payload.

The syntax 700 further includes a semantic refreshed_region_flag 706 having of a length of one bit. The refreshed_region_flag 706 may indicate that the slice associated with the current SEI message belongs to the refreshed region in the current picture (i.e., that the slice is refreshed). A value of 0 may indicate that the slice is not refreshed, while a value of 1 may indicate that the slice is refreshed. The syntax 700 further includes a semantic targetLayerIdList 708 having a length of one byte. The targetLayerIdList 708 may contain a list of all layer ids (nuh_layer_id) for all of the layers to which the region refresh information of the region refresh information SEI applies. Additionally, the region refresh SEI message may be associated with a recovery point SEI message that applies to layers having nuh_layer_id values equal to those in the targetLayerIdList.

Display Orientation SEI Message

In conventional HEVC single-layer bitstreams, there may be only one layer and that layer may be considered an output layer. However, in SHVC/MV-HEVC multi-layer bitstreams, there may be a set of output layers that describes which layers are to be output layers and which layers are not output layers. Since one or more layers may be a non-target-output layer of any output layer set, when a layer is not a target output layer, there may not be a display orientation SEI message associated with pictures in that layer. Such a constraint is missing from conventional HEVC semantics.

Currently, SHVC/MV-HEVC multi-layer bitstreams support an alternate output process feature. According to the feature, when a picture from an output layer is not present in a particular access unit, a picture from a non-output layer in the particular access unit, wherein the non-output layer is lower than the output layer (for example, has a lower picture ID value or is referenced by the output layer), may be used as alternate picture for output on the output layer. For example, picture picA belongs to a non-output layer layerA, and picture picB, which may or may not present, belongs to an output layer layerB. The value of nuh_layer_id of layerB is greater than the value of nuh_layer_id of layerA. Both picA and picB, if present, are contained in the same access unit. The following problems may present when alternate output process is allowed:

a) If two display orientation SEI messages are present and each display orientation SEI message applies to layerA and layerB, respectively, the two display orientation SEI messages are not identical, and picB is not present, when the alternate output process is invoked and picA is output instead of picB, there may be ambiguity regarding which of the two display orientation SEI messages will be applied to the picB.

b) Alternatively, or additionally, if there is only one display orientation SEI message and it applies to layerB and picB is not present, when the alternate output process is invoked and picA is output instead of picB, there may be ambiguity regarding whether or not the display orientation SEI message will be applied to picA.

To address such problems in multi-layer bitstreams, a constraint may be added for the display orientation SEI message such that when a layer is not indicated as a target output layer in any output layer set, there shall be no display orientation SEI message associated with pictures in that layer.

a) Accordingly, when a picture picA that is not in the current layer is used as alternative output for a picture in the current layer, the display orientation SEI message that applies to the current layer, if any, shall apply to the output picA.

b) Alternatively, or additionally, a constraint may be specified such that when the alternate output process is allowed for the current layer, no display orientation SEI message shall be associated with pictures in the current layer.

c) Alternatively, or additionally, a constraint may be specified such that when the alternate output process is allowed and a picture picA from a non-output layer is output as substitute of a non-present picture in an output layer, display orientation of the output picture shall be according to the display orientation SEI message, if present, that applies to the output layer.

Example Flowcharts

Figure 8:
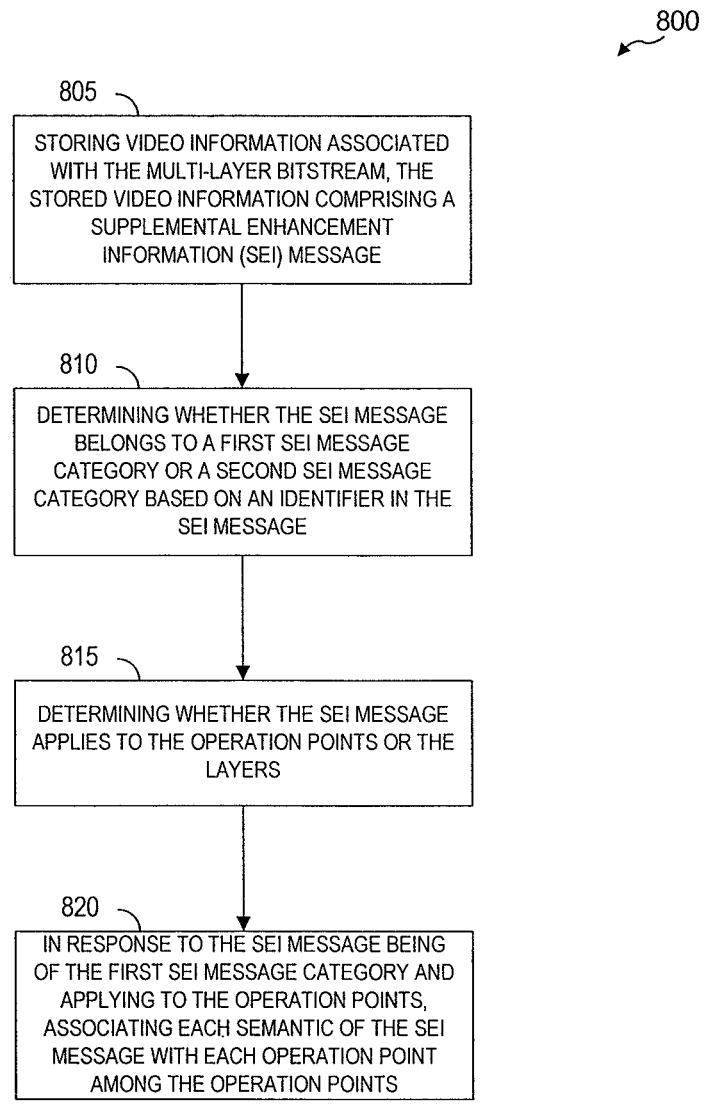
FIG. 8 shows a flowchart of a method for associating semantics of video coding information with layers or operation points of a multi-layer bitstream comprises storing video information associated with the multi-layer bitstream.

FIG. 8 shows a flowchart of a method 800 for associating semantics of video coding information with layers or operation points of a multi-layer bitstream comprises storing video information associated with the multi-layer bitstream. The method 800 of FIG. 8 may be performed by one or more of the components of FIGS. 1A-3B, for example a video decoder 30. The method 800 begins at block 805, comprising storing video information associated with the multi-layer bitstream, the stored video information comprising an SEI message. For example, the video information may be stored in a memory, such as storage device 31 of FIG. 1A, or in a similar means. Once the video information is stored, the method proceeds to block 810. At block 810, the method is shown determining whether the SEI message belongs to a first SEI message category or a second SEI message category based on an identifier in the SEI message. In some embodiments, the determination may be made by a processor or controller, such as processor/controller device 13 of FIG. 1B or one or more components of the video decoder 30 or a processor not shown in FIG. 3A or 3B. Once the category of SEI message is determined at block 810, the method 800 progresses to block 815, where the method is determining whether the SEI message applies to the operation points or the layers. This determination may be made by a processor or controller, such as processor/controller device 13 of FIG. 1B or one or more components of the video decoder 30 or a processor not shown in FIG. 3A or 3B. In some embodiments, the processor/controller device 13 or a processor now shown may comprise a means for determining. The method 800 then proceeds to block 820, where the method is shown, in response to the SEI message being of the first SEI message category and applying to the operation points, associating each semantic of the SEI message with each operation point among the operation points. This association may be performed by a processor or controller, such as processor/controller device 13 of FIG. 1B or one or more components of the video decoder 30 or a processor not shown in FIG. 3A or 3B. In some embodiments, the processor/controller device 13 or a processor now shown may comprise a means for associating.

Figure 9:
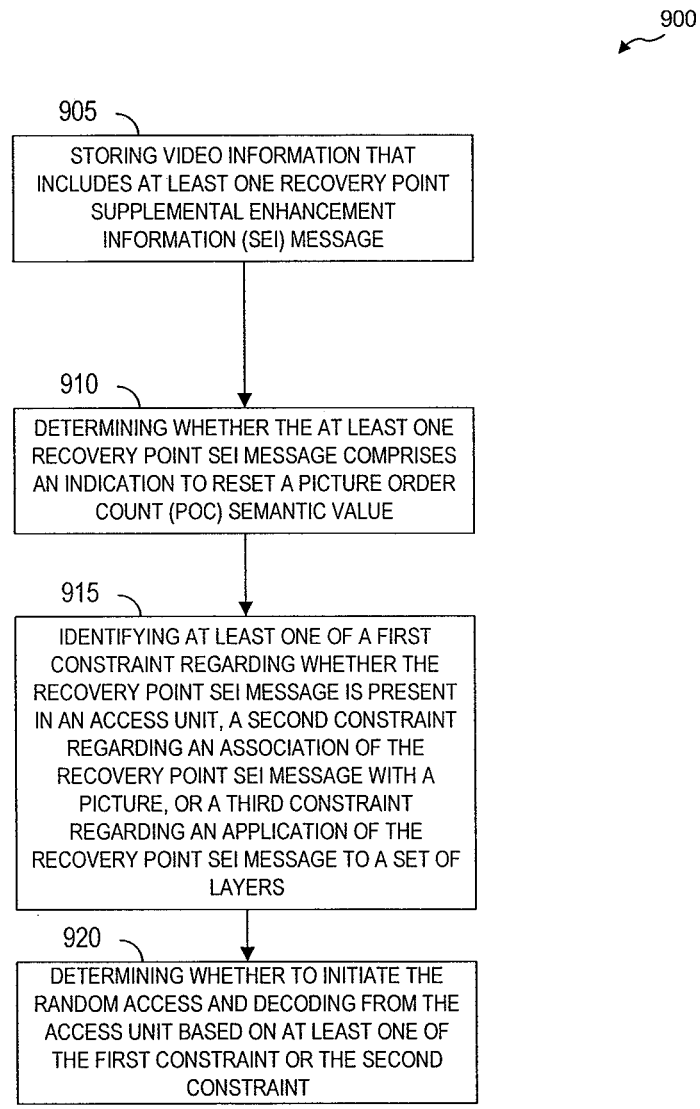
FIG. 9 shows a flowchart of a method for determining whether to initiate random access during the decoding of video information of a multi-layer bitstream.

FIG. 9 shows a flowchart of a method 900 for determining whether to initiate random access during the decoding of video information of a multi-layer bitstream. The method 900 of FIG. 9 may be performed by one or more of the components of FIGS. 1A-3B, for example a video decoder 30. The method 900 begins at block 905, comprising storing video information that includes at least one recovery point SEI message. For example, the video information may be stored in a memory, such as storage device 31 of FIG. 1A, or in a similar means. Once the video information is stored, the method 900 proceeds to block 910. At block 910, the method is shown determining whether the at least one recovery point SEI message comprises an indication to reset a POC semantic value. In some embodiments, the determination may be made by a processor or controller, such as processor/controller device 13 of FIG. 1B or one or more components of the video decoder 30 or a processor not shown in FIG. 3A or 3B. Once the at least one recovery point SEI message is determined to comprise an indication to reset POC value at block 910, the method 900 progresses to block 915, where the method is identifying at least one of a first constraint regarding whether the recovery point SEI message is present in an access unit, a second constraint regarding an association of the recovery point SEI message with a picture, or a third constraint regarding an application of the recovery point SEI message to a set of layers. This identification may be made by a processor or controller, such as processor/controller device 13 of FIG. 1B or one or more components of the video decoder 30 or a processor not shown in FIG. 3A or 3B. In some embodiments, the processor/controller device 13 or a processor now shown may comprise a means for determining. The method 900 then proceeds to block 920, where the method is shown determining whether to initiate the random access and decoding from the access unit based on at least one of the first constraint or the second constraint. This determination may be performed by a processor or controller, such as processor/controller device 13 of FIG. 1B or one or more components of the video decoder 30 or a processor not shown in FIG. 3A or 3B. In some embodiments, the processor/controller device 13 or a processor now shown may comprise one or more of a means for determining, a means for identifying, a means for associating, means for deriving, and a means for coding.

Example Implementation(s)

Some embodiments of the present disclosure are summarized and described below. When certain portions of the SHVC/MV-HEVC specification are reproduced to illustrate the additions and deletions that may be incorporated to implement one or more of the methods described herein, such additions are shown in underline and deletions are shown in strikethrough.

TABLE 1

| MV-HEVC modifications to Standards Text |
| --- |

Change the following definitions in clause 3 as follows:

3.X     <u>access unit: A set of NAL units that are associated with each other according to a specified classification rule, are consecutive in decoding order, and contain the VCL NAL units of all coded pictures associated with the same output time and their associated non-VCL NAL units.</u>
       NOTE - Pictures in the same access unit are associated with the same picture order count.

Add the following definitions to clause 3:

3.X     base bitstream partition: A bitstream partition that is also a conforming bitstream itself.

3.X     bitstream partition: A sequence of bits, in the form of a NAL unit stream or a byte stream, that is a subset of a bitstream according to a partitioning.

3.X     output layer: A layer of an output layer set that is output when TargetOptLayerSetIdx is equal to the index of the output layer set.

3.X     output layer set: A set of layers consisting of the layers of one of the specified layer sets, where one or more layers in the set of layers are indicated to be output layers.

3.X     <u>output operation point: A bitstream that is created from another bitstream by operation of the sub-bitstream extraction process with the another bitstream, a target highest TemporalId, and a target layer identifier list as inputs, and that is associated with a set of target output layers.</u>

3.X     <u>picture unit: A set of NAL units that are associated with each other according to a specified classification rule, are consecutive in decoding order, and contain the VCL NAL units of a coded picture and their associated non-VCL NAL units.</u>

3.X     target output layer: A layer that is to be output and is one of the output layers of the output layer set with index olsIdx such that TargetOptLayerSetIdx is equal to olsIdx.

3.X     target output layer set: An output layer set associated with variable TargetOptLayerSetIdx that specifies a layer identifier list of an <u>output</u> operation point in use and a set of target output layers.

Add the following to subclause D.3.1:

In the following subclauses of this annex, when a particular SEI message applies to a set of one or more layers (instead of a set of operation points), i.e. when the payloadType value is not equal to one of 0 (buffering period), 1 (picture timing), and 130 (decoding unit information), the following applies:

- The semantics apply independently to each particular layer with nuh_layer_id equal to targetLayerId of the layers to which the particular SEI message applies.
- The current SEI message refers to the particular SEI message.
- The current access unit refers to the access unit containing the current SEI message.
- The current layer refers to the layer with nuh_layer_id equal to targetLayerId.
- The current picture or current decoded picture refers to the picture with nuh_layer_id equal to targetLayerId (i.e. in the current layer) in the current access unit.
- The direct and indirect reference layers of the current layer are referred to as the reference layers of the current layer.

In the following subclauses of this annex, when a particular SEI message applies to a set of one or more operation points (instead of a set of one or more layers), i.e. when the payloadType value is equal to 0 (buffering period), 1 (picture timing), or 130 (decoding unit information), the following applies:

- The semantics apply independently to each particular operation opint of the set of operation points to which the particular SEI message applies.
- The current SEI message refers to the particular SEI message.
- The current operation point refers to the particular operation point.
- The terms "access unit" and "CVS" apply to the bitstream BitstreamToDecode that is the sub-bitstream of the particular operation point.

Modify subclause D.3.2 as follows:

...

<s>In this subclause, the terms "access unit" and "CVS" apply to the bitstream BitstreamToDecode that is the sub-bitstream of an operation point the buffering period SEI message applies to.</s>

The presence of buffering period SEI messages for an operation point is specified as follows:

- If NalHrdBpPresentFlag is equal to 1 or VclHrdBpPresentFlag is equal to 1, the following applies for each access unit in the CVS:
  - If the access unit is an IRAP access unit, a buffering period SEI message applicable to the operation point shall be associated with the access unit.
  - Otherwise, if both of the following conditions apply, a buffering period SEI message applicable to the operation point may or may not be present for the access unit:
    - The <s>picture</s> <u>access unit</u> has TemporalId equal to 0.
    - The <u>access unit has at least one</u> picture <u>that has dicardable_flag equal to 1 and</u> is not a RASL, RADL or sub-layer non-reference picture.
  - Otherwise, the access unit shall not be associated with a buffering period SEI message applicable to the operation point.

TABLE 1-continued

MV-HEVC modifications to Standards Text

- Otherwise (NalHrdBpPresentFlag and VclHrdBpPresentFlag are both equal to 0), no access unit in the CVS shall be associated with a buffering period SEI message applicable to the operation point.

NOTE 1 - For some applications, frequent presence of buffering period SEI messages may be desirable (e.g. for random access at an IRAP picture or a non-IRAP picture or for bitstream splicing).

Modify subclause D.3.4 as follows:
pan_scan_rect_cancel_flag equal to 1 indicates that the SEI message cancels the persistence of any previous pan-scan rectangle SEI message in output order <u>that applies to the current layer</u><s>same set of layers that the current SEI message applies to.</s> pan_scan_rect_cancel_flag equal to 0 indicates that pan-scan rectangle information follows.
pan_scan_rect_persistence_flag specifies the persistence of the pan-scan rectangle SEI message <u>for the current layer</u>.
pan_scan_rect_persistence_flag equal to 0 specifies that the pan-scan rectangle information applies to the current decoded picture only.
Let <s>an A conaining a picture</s> picA be the current <u>picture</u><s>access unit</s>.
pan_scan_rect_persistence_flag equal to 1 specifies that the pan-scan rectangle information persists <u>for the current layer</u> in output order until any of the following conditions are true:
- A new CVS begins.
- The bitstream ends.
- <s>An access unit auB containing a</s> picture picB <u>in the current layer</u> in an access unit containing<s>and</s> a pan-scan rectangle SEI message with the same value of pan_scan_rect_id and applicable to the <s>same set of layers as the</s> current layer <s>SEI message</s> is output for which PicOrderCnt( picB ) is greater than PicOrderCnt( picA ), where PicOrderCnt( picB ) and PicOrderCnt( picA ) are the PicOrderCntVal values of picB and picA, respectively, immediately after the invocation of the decoding process for picture order count for picB.

Modify subclause D.3.8 as follows:
<s>The current picture refers to the picture with nuh_layer_id equal to targetLayerId in the access unit containing the current SEI message, the current access unit refers to the access unit containing the current SEI message, and the current layer refers to the layer with nuh_layer_id equal to targetLayerId. The direct and indirect reference layers of the current layer are referred to as reference layers.</s>
The recovery point SEI message assists a decoder in determining when the decoding process will produce acceptable pictures <u>in the current layer</u> <s>with nuh_layer_id equal to targetLayerId</s> for display after the decoder initiates random access <u>or layer up-switching,</u> or after the encoder indicates a broken link.
When the recovery point SEI message applies to the current layer and all the reference layers of the current layer, the current picture <u>that is present in the access unit containing the recovery point SEI message</u> is indicated as a layer random-accessing picture. When the recovery point SEI message applies to the current layer <u>but not to all the reference layers of the current layer</u><s>only</s>, the current picture <u>that is present in the access unit containing the recovery point SEI message</u> is indicated as a layer up-switching picture.
Decoded pictures <s>with nuh_layer_id equal to targetLayerId</s><u>in the current layer</u> produced by random access <u>or layer up-switching</u> at or before the <u>current</u> access unit <s>containing the recovery point SEI message</s> need not be correct in content until the indicated recovery point, and the operation of the decoding process starting at <u>the current</u> access unit <s>containing the recovery point SEI message</s> may contain references to pictures unavailable in the decoded picture buffer. In addition, by use of the broken_link_flag, the recovery point SEI message can indicate to the decoder the location of some pictures <s>with nuh_layer_id equal to targetLayerId</s><u>in the current layer</u> in the bitstream that can result in serious visual artefacts when displayed, even when the decoding process was begun at the location of a previous <u>IRAP</u> access unit <s>containing an IRAP picture with nuh_layer_id equal to targetLayerId</s> in decoding order <u>that contain IRAP pictures in all layers</u>.

NOTE 2 - The broken_link_flag can be used by encoders to indicate the location of a point after which the decoding process for the decoding of some pictures <s>with nuh_layer_id equal to targetLayerId</s><u>in the current layer</u> may cause references to pictures that, though available for use in the decoding process, are not the pictures that were used for reference when the bitstream was originally encoded (e.g. due to a splicing operation performed during the generation of the bitstream).

<u>The following conditions shall be satisfied for a recovery point that is applicable to current layer:</u>
- <u>When a layer layerA has at least one reference layer, and pictures belonging of layerA and all its reference layers in a particular access unit have poc_msb_val_present_flag equal to 0 and poc_reset_idc equal to 0, the access unit shall not contain an SEI NAL unit containing a recovery point SEI message that applies to the set of layers containing only layerA and all its reference layers.</u>
- <u>When a layer layerA has nuh_layer_id greater than 0, and a picture of layerA in a particular access unit has poc_msb_val_present_flag equal to 0 and poc_reset_idc equal to 0, the access unit shall not contain an SEI NAL unit containing a recovery point SEI message that applies only to layerA.</u>
- <u>When a picture picA belonging to the layer with nuh_layer_id equal to 0 and</u> <s>all</s> <u>any</u> <s>the</s> <u>pictures that succeeds, in decoding order, the picture picA and precedes, in decoding order, the next IRAP picture with NoRaslOutputFlag equal to 1 and nuh_layer_id equal to 0, including picA and the next IRAP picture,</u> <s>have</s> <u>has slice_segment_header_extension_length greater than 0, poc_msb_val_present_flag equal</u>

TABLE 1-continued

MV-HEVC modifications to Standards Text to 0 and poc_reset_idc equal to 0, then that access unit containing picA shall not contain an SEI NAL unit containing a recovery point SEI message that applies only to the layer with nuh_layer_id equal to 0.

Alternatively, the following conditions are added.

- If the recovery point SEI message is nested and applies to more than one layer, then all pictures of the layers to which the recovery point SEI message applies to in the current access unit shall have poc_msb_val_present_flag equal to 1 or have poc_reset_idc greater than 0.
- Otherwise, if the recovery point SEI message (nested or non-nested) only applies to a layer that has nuh_layer_id greater than 0, then the picture of the layer that belongs to the current access unit shall have poc_msb_val_present_flag equal to 1 or have poc_reset_idc greater than 0.
  - Otherwise (, if the recovery point SEI message only applies to the layer with nuh_layer_id equal to 0), when and there at is least one picture in the CVS that succeeds, in decoding order, the current picture and preceeds, in decoding order, the next IRAP picture with NoRaslOutputFlag equal to 1, including the current picture and the next IRAP picture, with the value of the syntax element slice_segment_header_extension_length greater than 0, then the current picture picture of the layer that belongs to the current access unit containing the recovery point SEI message shall have poc_msb_val_present_flag equal to 1 or have poc_reset_idc equals to 1 or 2 greater than 0.

Alternatively, the following constraints are added.

- If there is any picture in any of the layers the current SEI message applies to in an access unit that follows, in decoding order, the current access unit has poc_msb_val_present_flag present, each picture in any of the layers the current SEI messages applies shall have poc_msb_val_present_flag equal to 1 or poc_reset_idc greater than 0.]

recovery_poc_cnt specifies the recovery point of decoded pictures with nuh_layer_id equal to targetLayerId in the current layer in output order. If there is a picture picB with nuh_layer_id equal to targetLayerId in the current layer that follows the current picture picA but precedes an access unit containing an IRAP picture with nuh_layer_id equal to targetLayerId in the current layer in decoding order and PicOrderCnt( picB ) is equal to PicOrderCnt( picA ) plus the value of recovery_poc_cnt, where PicOrderCnt( picA ) and PicOrderCnt( picB ) are the PicOrderCntVal values of picA and picB, respectively, immediately after the invocation of the decoding process for picture order count for picB, the picture picB is referred to as the recovery point picture. Otherwise, the first picture picC with nuh_layer_id equal to targetLayerId in the current layer in output order for which PicOrderCnt( picC ) is greater than PicOrderCnt( picA ) plus the value of recovery_poc_cnt is referred to as the recovery point picture, where PicOrderCnt( picA ) and PicOrderCnt( picC ) are the PicOrderCntVal values of picA and picC, respectively, immediately after the invocation of the decoding process for picture order count for picC. The recovery point picture shall not precede the current picture in decoding order. All decoded pictures nuh_layer_id equal to targetLayerId in the current layer in output order are indicated to be correct or approximately correct in content starting at the output order position of the recovery point picture. The value of recovery_poc_cnt shall be in the range of −MaxPicOrderCntLsb/2 to MaxPicOrderCntLsb/2 − 1, inclusive.

exact_match_flag indicates whether decoded pictures with nuh_layer_id equal to targetLayerId in the current layer at and subsequent to the specified recovery point in output order derived by starting the decoding process at the access unit containing the recovery point SEI message will be an exact match to the pictures with nuh_layer_id equal to targetLayerId in the current layer that would be produced by starting the decoding process at the location of a previous access unit where the picture of the layer with nuh_layer_id equal to targetLayerId in the current layer and the pictures of all the direct and indirect reference layers are IRAP pictures, if any, in the bitstream. The value 0 indicates that the match may not be exact and the value 1 indicates that the match will be exact. When exact_match_flag is equal to 1, it is a requirement of bitstream conformance that the decoded pictures with nuh_layer_id equal to targetLayerId in the current layer at and subsequent to the specified recovery point in output order derived by starting the decoding process at the access unit containing the recovery point SEI message shall be an exact match to the pictures with nuh_layer_id equal to targetLayerId in the current layer that would be produced by starting the decoding process at the location of a previous access unit where the picture of the layer with nuh_layer_id equal to targetLayerId in the current layer and the pictures of all the direct and indirect reference layers are IRAP pictures, if any, in the bitstream.

broken_link_flag indicates the presence or absence of a broken link in the layer nuh_layer_id equal to targetLayerId in the current layer at the location of the recovery point SEI message and is assigned further semantics as follows:

- If broken_link_flag is equal to 1, pictures with nuh_layer_id equal to targetLayerId in the current layer produced by starting the decoding process at the location of a previous access unit where the picture of the layer with nuh_layer_id equal to targetLayerId in the current layer and the pictures of all the direct and indirect reference layers are IRAP pictures may contain undesirable visual artefacts to the extent that decoded pictures with nuh_layer_id equal to targetLayerId in the current layer at and subsequent to the access unit containing the recovery point SEI message in decoding order should not be displayed until the specified recovery point in output order.

TABLE 1-continued

MV-HEVC modifications to Standards Text

- Otherwise (broken_link_flag is equal to 0), no indication is given regarding any potential presence of visual artefacts.

When the current picture is a BLA picture, the value of broken_link_flag shall be equal to 1.
Regardless of the value of the broken_link_flag, pictures ~~with nuh_layer_id equal to targetLayerId~~ in the current layer subsequent to the specified recovery point in output order are specified to be correct or approximately correct in content.
Modify subclause D.3.11 as follows:
The progressive refinement segment start SEI message specifies the beginning of a set of consecutive coded pictures in the current layer ~~that the progressive refinement segment start SEI message applies to~~ in decoding order that consists of the current picture and a sequence of one or more subsequent pictures in the current layer that refine ~~with nuh_layer_id equal to targetLayerId of refinement of~~ the quality of the current picture, rather than a representation of a continually moving scene.
Let picA ~~with nuh_layerId equal to nuhLayerIdA~~ be the current picture. ~~Let refinementPicSetwith be the~~ The tagged set of consecutive coded pictures refinementPicSet in the current layer ~~nuh_layer_id equal to nuhLayerIdA~~ starts from the next picture in the current layer after the current picture in decoding order and continues until one of the following conditions is true:
- A new CVS begins.
- The bitstream ends.
- pic_order_cnt_delta is greater than 0 and the PicOrderCntVal of the next slice,which belongs to the picture picB in the current layer ~~with nuh_layer_id equal to nuhLayerIdA~~, to be decoded, i.e. PicOrderCnt( picB ), is greater than PicOrderCnt( picA ) plus pic_order_cnt_delta, where PicOrderCnt( picB ) and PicOrderCnt( picA ) are the PicOrderCntVal values of picB and picA, respectively, immediately after the invocation of the decoding process for picture order count for picB.
- A progressive refinement segment end SEI message that has ~~with~~ the same progressive_refinement_id as the one in this SEI message and also applies to the current layer is decoded.

The decoding order of pictures within refinementPicSet ~~the tagged set of consecutive pictures with nuh_layer_id equal to targetLayerId~~ should be the same as their output order.
pic_order_cnt_delta specifies the last picture in refinementPicSet ~~the tagged set of consecutive coded pictures~~ in decoding order as follows:
- If pic_order_cnt_delta is equal to 0, the last picture in ~~of the tagged set of consecutive coded pictures~~ refinementPicSet in decoding order is the following picture:
    - If the CVS contains one or more pictures in the current layer ~~with nuh_layer_id equal to nuhLayerIdA~~ that follow the current picture in decoding order and are associated with a progressive refinement segment end SEI message that has ~~with~~ the same progressive_refinement_id and also applies to the current layer, the last picture in the refinementPicSet ~~of the tagged set of consecutive coded pictures in decoding order~~ is the first of these pictures in decoding order.
    - Otherwise, the last picture in ~~of the tagged set of consecutive coded pictures in decoding order~~ refinementPicSet is the last picture in the current layer within ~~of~~ the CVS ~~within nuh layer id equal to nuhLayerIdA~~ in decoding order.
- Otherwise, the last picture ~~of the~~ in tagged set of consecutive coded pictures refinementPicSet in decoding order is the following picture:
    - If the CVS contains one or more pictures ~~with nuh_layer_id equal to nuhLayerIdA~~ in the current layer that follow the current picture in decoding order, ~~and~~ are associated with a progressive refinement segment end SEI message with the same progressive_refinement_id and applicable to the current layer, and precede any picture picC in the current layer ~~with nuh_layer_id equal to nuhLayerIdA~~ in the CVS for which PicOrderCnt( picC ) is greater than PicOrderCnt( picA ) plus pic_order_cnt_delta, where PicOrderCnt( picC ) and PicOrderCnt( picA ) are the PicOrderCntVal values of picC and picA, respectively, immediately after the invocation of the decoding process for picture order count for picC, the last picture in refinementPicSet ~~of the tagged set of consecutive coded pictures~~ in decoding order is the first of these pictures in decoding order.
    - Otherwise, if the CVS contains one or more pictures picD ~~with nuh_layer_id equal to nuhLayerIdA~~ in the current layer that follow the current picture in decoding order for which PicOrderCnt( picD ) is greater than PicOrderCnt( picA ) plus pic_order_cnt_delta, where PicOrderCnt( picD ) and PicOrderCnt( picA ) are the PicOrderCntVal values of picD and picA, respectively, immediately after the invocation of the decoding process for picture order count for picD, the last picture in refinementPicSet ~~of the tagged set of consecutive coded pictures~~ in decoding order is the last picture in the current layer that precedes the first of these pictures in decoding order.
    - Otherwise, the last picture in refinementPicSet ~~of the tagged set of consecutive coded pictures~~ in decoding order is the last picture in the current layer with ~~with nuh_layer_id equal to nuhLayerIdA of~~ in the CVS in decoding order.

The value of pic_order_cnt_delta shall be in the range of 0 to 256, inclusive.
Modify subclause D.3.13 as follows:
film_grain_characteristics_cancel_flag equal to 1 indicates that the SEI message cancels the persistence of any previous film grain characteristics SEI message in output order that applies to the current layer. film_grain_characteristics_cancel_flag equal to 0 indicates that film grain modelling information follows.
...
film_grain_characteristics_persistence_flag specifies the persistence of the film grain characteristics SEI message for the current layer.

TABLE 1-continued

MV-HEVC modifications to Standards Text film_grain_characteristics_persistence_flag equal to 0 specifies that the film grain
characteristics SEI message applies to the current decoded picture only.
Let picA be the current picture. film_grain_characteristics_persistence_flag equal to 1
specifies that the film grain characteristics SEI message persists <u>for the current layer</u> in output
order until any of the following conditions are true:
-         A new CVS begins.
-         The bitstream ends.
-         A picture picB <u>in the current layer</u> <s>with nuh_layer_id equal to targetLayerId</s> in an access
        unit containing a film grain characteristics SEI message <u>that is applicable to the current
        layer</u> is output for which PicOrderCnt( picB ) is greater than PicOrderCnt( picA ), where
        PicOrderCnt( picB ) and PicOrderCnt( picA ) are the PicOrderCntVal values of picB and
        picA, respectively, immediately after the invocation of the decoding process for picture
        order count for picB.
Modify subclause D.3.<s>14</s> <u>15</u> as follows:
tone_map_cancel_flag equal to 1 indicates that the tone mapping information SEI message
cancels the persistence of any previous tone mapping information SEI message in output <u>order
that applies to the current layer</u>. tone_map_cancel_flag equal to 0 indicates that tone mapping
information follows.
tone_map_persistence_flag specifies the persistence of the tone mapping information SEI
message <u>for the current layer</u>.
tone_map_persistence_flag equal to 0 specifies that the tone mapping information applies to
the current decoded picture only.
Let picA be the current picture. tone_map_persistence_flag equal to 1 specifies that the tone
mapping information persists <u>for the current layer</u> in output order until any of the following
conditions are true:
-         A new CVS begins.
-         A picture picB <u>in the current layer</u> in an access unit containing a tone mapping
        information SEI message with the same value of tone_map_id <u>and applicable to the
        current layer</u> is output for which PicOrderCnt( picB ) is greater than PicOrderCnt( picA ),
        where PicOrderCnt( picB ) and PicOrderCnt( picA ) are the PicOrderCntVal values of
        picB and picA, respectively, immediately after the invocation of the decoding process for
        picture order count for picB.
Modify subclause D.3.16 as follows:
frame_packing_arrangement_cancel_flag equal to 1 indicates that the frame packing
arrangement SEI message cancels the persistence of any previous frame packing arrangement
SEI message in output order <u>that applies to the current layer</u>.
frame_packing_arrangement_cancel_flag equal to 0 indicates that frame packing arrangement
information follows.
...
frame_packing_arrangement_persistence_flag specifies the persistence of the frame
packing arrangement SEI message <u>for the current layer</u>.
frame_packing_arrangement_persistence_flag equal to 0 specifies that the frame packing
arrangement SEI message applies to the current decoded frame only.
Let picA be the current picture. frame_packing_arrangement_persistence_flag equal to 1
specifies that the frame packing arrangement SEI message persists <u>for the current layer</u> in
output order until any of the following conditions are true:
-         A new CVS begins.
-         The bitstream ends.
-         A frame picB <u>in the current layer</u><s>with nuh_layer_id equal to targetLayerId</s> in an access
        unit containing a frame packing arrangement SEI message with the same value of
        frame_packing_arrangement_id <u>and applicable to the current layer</u> is output for which
        PicOrderCnt( picB ) is greater than PicOrderCnt( picA ), where PicOrderCnt( picB ) and
        PicOrderCnt( picA ) are the PicOrderCntVal values of picB and picA, respectively,
        immediately after the invocation of the decoding process for picture order count for picB.
Modify subclause D.3.17 as follows:
<u>When the current a layer is not indicated as an output layer in any output layer set, there shall
be no display orientation SEI message</u> <s>application</s><u>applicable to the current</u> <s>associated</s> <u>picture
<s>in that</s> layer</u> .
        <u>NOTE 1 - When a picture picA that is not in the current layer is used as alternative output
        for a picture in the current layer, display orientation SEI message that applies to the current
        layer, if any, shall apply to the output picA.</u>
...
display_orientation_persistence_flag specifies the persistence of the display orientation SEI
message <u>for the current layer</u>.
display_orientation_persistence_flag equal to 0 specifies that the display orientation SEI
message applies to the current decoded picture only.
Let picA be the current picture. display_orientation_persistence_flag equal to 1 specifies that
the display orientation SEI message persists <u>for the current layer</u> in output order until one or
more of the following conditions are true:
-         A new CVS begins.
-         The bitstream ends.
-         A picture picB <u>in the current layer</u> in an access unit containing a display orientation SEI
        message <u>that is applicable to the current layer</u> is output for which PicOrderCnt( picB ) is
        greater than PicOrderCnt( picA ), where PicOrderCnt( picB ) and PicOrderCnt( picA )
        are the PicOrderCntVal values of picB and picA, respectively, immediately after the
        invocation of the decoding process for picture order count for picB.

TABLE 1-continued

MV-HEVC modifications to Standards Text

Modify subclause D.3.18 as follows:
The structure of pictures information SEI message provides information for a list of entries, some of which correspond to a series of pictures in decoding order <u>in the current layer</u> in the CVS.
The first entry in the structure of pictures information SEI message corresponds to the current picture. When there is a picture <u>in the current layer</u> that has PicOrderCntVal equal to the variable entryPicOrderCnt[ i ] as specified below, the entry i corresponds to <u>the picture.</u> The decoding order of the pictures in the current layer in the CVS that correspond to entries in the structure of pictures information SEI message corresponds to increasing values of i in the list of entries.
Any picture <u>in the current layer</u> in the CVS that has PicOrderCntVal equal to entryPicOrderCnt[ i ] for any i in the range of 0 to num_entries_in_sop_minus1, inclusive, shall correspond to an entry in the list of entries.
The structure of pictures information SEI message shall not be present in a CVS <u>and applicable for a layer</u> for which the active SPS has long_term_ref_pics_present_flag equal to 1 or num_short_term_ref_pic_sets equal to 0.
<u>The structure of pictures information SEI message shall not be present in any access unit that has TemporalId greater than 0 or contains a RASL, RADL or sub-layer non-reference picture in the current layer. Any picture in the current layer in the CVS that corresponds to an entry other than the first entry described in the structure of pictures information SEI message shall not be an IRAP picture.</u>
Modify subclause D.3.19 as follows:
This message provides a hash for each colour component of the <u>current</u> decoded ~~picture in the current access unit~~.
  NOTE 1 - The decoded picture hash SEI message is a suffix SEI message <u>and cannot be contained in a scalable nesting SEI message.</u>
  ~~NOTE 2 The decoded picture hash SEI message shall no be contained in a scalable nesting SEI message.~~
Modify subclause D.2.20 as follows:

| active_parameter_sets( payloadSize ) { | Descriptor |
|---|---|
|   active_video_parameter_set_id | u(4) |
|   self_contained_cvs_flag | u(1) |
|   no_parameter_set_update_flag | u(1) |
|   num_sps_ids_minus1 | ue(v) |
|   for( i = 0; i <= num_sps_ids_minus1; i++ ) { | |
|     active_seq_parameter_set_id[ i ] | ue(v) |
|     <u>target_nuh_layer_id[i]</u> | <u>u(6)</u> |
|   } | |
| } | | num_sps_ids_minus1 plus 1 indicates and shall be equal to the number of SPSs that are referred to by the VCL NAL units of the access unit associated with the active parameter sets SEI message. ~~In bitstreams conforming to this version of this Specification, num_sps_ids_minus1 shall be equal to 0. Although the value of num_sps_ids_minus1 is required to be equal to 0 in this version of Specification, decoders shall allow other~~ The values of num_sps_ids_minus1 shall be in the range of 0 to 15, inclusive~~, to appear in the syntax~~.
active_seq_parameter_set_id[ i ] indicates and shall be equal to the value of the sps_seq_parameter_set_id of the SPS that is referred to by the VCL NAL units <u>with nuh_layer_id</u> ~~equal to~~<u>in the range of target_nuh_layer_id[ i ] to target_nuh_layer_id[ i + 1 ] - 1, inclusive,</u> of the access unit associated with the SEI message. The value of active_seq_parameter_set_id<u>[ i ]</u> shall be in the range of 0 to 15, inclusive.
<u>target_nuh_layer_id[ i ]specifies the targetL layerId associated with active_seq_parameter_set_id[ i ]. The value of target_nuh_layer_id[ i ] is in the range of 0 to 62, inclusive for i in the range of 0 to num_sps_ids_minus1, inclusive. The value of of active_seq_parameter_set_id[ i ] is set to be equal to 63.</u>
<u>When this SEI message present, the following bitstream</u> ~~conformance~~<u>conditions shall apply</u>~~ies~~:
-     <u>the value of target_nuh_layer_id[ 0 ] shall be 0.</u>
-     <u>the value of target_nuh_layer_id[ j ] and target_nuh_layer_id[ k ] where j is not equal k, shall not be the same.</u>
-     <u>the value of target_nuh_layer_id[ j ] shall be less than the value of target_nuh_layer_id[ k ] where j is less than k,</u> ~~shall not be the same~~<u>.</u>
-     <u>when</u> ~~there is a gap between~~ <u>target_nuh_layer_id[ i ]</u> ~~and~~ <u>target_nuh_layer_id[ i - 1 ] is greater than 1, for i in the range of 1 to num_sps_ids_minus1, inclusive, the active SPS for the any layer with nuh_layer_id in the range of</u> ~~between~~ <u>target_nuh_layer_id[i - 1] and target_nuh_layer_id[ i ] - 1, inclusive, is inferred to be equal to the one indicated by active_seq_parameter_set_id[ i - 1 ].</u>

Modify subclause D.3.22 as follows:
The temporal sub-layer zero index SEI message provides information that can assist the decoder for detection of missing coded pictures that have TemporalId <u>and discardable_flag both</u> equal to 0 and are not RASL pictures, RADL pictures, or sub-layer non-reference pictures.
When a temporal sub-layer zero index SEI message is present in the current access unit <u>and applies to the current layer</u> and the current <u>picture</u>~~access unit~~ is not an IRAP ~~access unit~~<u>picture</u>, a temporal sub-layer zero index SEI message <u>that applies to the current layer</u> shall

TABLE 1-continued

MV-HEVC modifications to Standards Text also be present in the preceding access unit in decoding order with TemporalId equal to 0 and containing a picture in the current layer.
temporal_sub_layer_zero_idx indicates a temporal sub-layer zero index as follows:
- If the TemporalId of the current ~~access unit~~picture is equal to 0, temporal_sub_layer_zero_idx indicates the temporal sub-layer zero index for the current ~~access unit~~picture.
- Otherwise, temporal_sub_layer_zero_idx indicates the temporal sub-layer zero index of the preceding picture in the current layer ~~access unit~~ in decoding order with TemporalId equal to 0.

When the bitstream contains a preceding access unit in decoding order that has TemporalId equal to 0 and the contained picture in the current layer has discardable_flag equal to 0 and is not a RASL picture, a RADL picture, or a sub-layer non-reference picture, and that preceding access unit contains ~~has an associated~~ a temporal sub-layer zero index SEI message that applies to the current layer, the variable prevTsl0Idx is set equal to the value of temporal_sub_layer_zero_idx of that ~~is associated with that preceding access unit~~ SEI message.

The following constraints apply to the value of temporal_sub_layer_zero_idx:
- If the current ~~access unit~~picture is an IRAP ~~access unit~~picture, temporal_sub_layer_zero_idx shall be equal to 0.
- Otherwise, the following applies:
  - If the current picture has TemporalId and discardable_flag both equal to 0 and is not a RASL picture, a RADL picture, or a sub-layer non-reference picture, temporal_sub_layer_zero_idx shall be equal to ( prevTsl0Idx + 1 ) % 256.
  - Otherwise, temporal_sub_layer_zero_idx shall be equal to prevTsl0Idx.

irap_pic_id is an IRAP ~~access unit~~picture identifier for the current layer. When the current ~~access unit~~picture is not the first ~~access unit~~picture in the current layer in the bitstream in decoding order and the preceding IRAP picture in the current layer ~~access unit~~ in decoding order has an associated temporal sub-layer zero index SEI message, the following constraints apply to the value of irap_pic_id:
- If the current ~~access unit~~picture is an IRAP ~~access unit~~picture, irap_pic_id shall differ in value from the value of irap_pic_id of the temporal sub-layer zero index SEI message associated with~~of~~ the preceding IRAP picture in the current layer ~~access unit~~ in decoding order.
  NOTE – It is suggested for the value of irap_pic_id to be set to a random value (subject to the constraints specified herein), to minimize the likelihood of duplicate values appearing in the a layer in the bitstream due to picture losses or splicing operations.
- Otherwise, irap_pic_id shall be equal to the value of irap_pic_id of the temporal sub-layer zero index SEI message associated with~~of~~ the preceding IRAP picture in the current layer ~~access unit~~ in decoding order.

Modify subclause D.3.24 as follows:
The region refresh information SEI message indicates whether the slice segments that the current SEI message applies to belong to a refreshed region of the current picture ~~( as defined below )~~.
The variable targetLayerIdList is derived as follows:
- If the region refresh information SEI message applies to the current layer and all the reference layers, targetLayerIdList contains the nuh_layer_id of the current layer and all the reference layers.
- Otherwise, targetLayerIdList contains the nuh_layer_id of the current layer.

The region refresh SEI message is associated with a recovery point SEI message that applies to targetLayerIdList.
Alternatively, the region refresh SEI message is associated a recovery point SEI message that applies to the targetLayerIdList and that does not apply to any other layer.
Alternatively, the region refresh SEI message can be associated with any recovery point SEI message that applies to the targetLayerIdList.
~~An access unit~~ picture that ~~is either a layer random accessing picture~~belongs to a layer with nuh_layer_id greater than 0 or a picture that is not an IRAP picture and belongs to the layer with nuh_layer_id equal to 0, ~~and~~ that ~~is associated with~~ contained in an access unit containing a recovery point SEI message where the recovery point SEI message applies to that layer is referred to as a gradual decoding refresh (GDR) ~~access unit~~picture, and the access unit containing the picture ~~its corresponding picture~~ is referred to as a GDR ~~picture~~access unit. The access unit corresponding to the indicated recovery point picture is referred to as the recovery point access unit.

If there is a picture picB ~~with nuh_layer_id equal to targetLayerId~~in the current layer that follows the GDR picture picA ~~with nuh_layer_id equal to targetLayerId~~in the current layer in decoding order in the CVS and PicOrderCnt( picB ) is equal to PicOrderCnt( picA ) plus the value of recovery_poc_cnt in the recovery point SEI message, where PicOrderCnt( picA ) and PicOrderCnt( picB ) are the PicOrderCntVal values of picA and picB, respectively, immediately after the invocation of the decoding process for picture order count for picB, let the variable lastPicInSet be the recovery point picture. Otherwise, let lastPicInSet be the picture in targetLayerIdList that immediately precedes the recovery point picture in output order. The picture lastPicInSet shall not precede the GDR access unit~~picture~~ in decoding order.

Let gdrPicSet be the set of pictures in targetLayerIdList starting from a GDR ~~picture~~ access unit to the ~~picture~~ access unit containing lastPicInSet, inclusive, in output order. When the decoding process for the current layer is started from a GDR access unit, the refreshed region

TABLE 1-continued

MV-HEVC modifications to Standards Text in each picture of the gdrPicSet is indicated to be the region of the picture that is correct or approximately correct in content, and, when lastPicInSet is <u>contained in the</u> the recovery point access unit~~picture~~, the refreshed region in lastPicInSet covers the entire picture.
The slice segments ~~of a picture in gdrPicSet~~<u>the current picture</u> to which a region refresh information SEI message applies consist of all slice segments within the <u>picture</u>~~access unit~~ that follow the SEI NAL unit containing the region refresh information SEI message and precede the next SEI NAL unit, <u>in decoding order,</u> containing a region refresh information SEI message (if any) <u>that has the same targetLayerIdList as the current SEI message</u>~~in decoding order~~. These slice segments are referred to as the slice segments associated with the region refresh information SEI message.
Region refresh information SEI messages shall not be present in an access unit unless the access unit is included in a gdrAuSet associated with a recovery point SEI message. When any <u>picture</u>~~access unit~~ that is included in a gdr<u>Pic</u>~~Au~~Set <u>is associated with</u>~~contains~~ one or more region refresh information SEI messages, all <u>pictures</u>~~access units~~ in the gdr<u>Pic</u>~~Au~~Set shall <u>be associated with</u>~~contain~~ one or more region refresh information SEI messages.
When one or more region refresh information SEI messages are <u>associated with a picture belonging to gdrPicSet</u>~~present in an access unit~~ and the first slice segment of the <u>picture</u>~~access unit~~ in decoding order does not have an associated region refresh information SEI message, the value of refreshed_region_flag for the slice segments <u>of the picture</u> that precede the first region refresh information SEI message is inferred to be equal to 0.
When lastPicInSet is the recovery point picture, and any region refresh SEI message is <u>associated with the</u> ~~included in a~~ recovery point access unit, the first slice segment of the <u>picture</u>~~access unit~~ in decoding order shall have an associated region refresh SEI message, and the value of refreshed_region_flag shall be equal to 1 in all region refresh SEI messages <u>associated with the picture</u> ~~in the access unit~~.
When one or more region refresh information SEI messages are <u>associated with a picture</u> ~~present in an access unit~~, the refreshed region in the picture is specified as the set of CTUs in all slice segments of the <u>picture</u> ~~access unit~~ that are associated with region refresh information SEI messages that have refreshed_region_flag equal to 1. Other slice segments belong to the non-refreshed region of the picture.
Let gdrRefreshedSliceSegmentSet be the set of all slice segments that belong to the refreshed regions in the gdrPicSet. <u>The variable upSwitchingRefreshedSliceSegmentSet is derived as follows:</u>
- <u>If targetLayerIdList contains only one non-zero nuh_layer_id, upSwitchingRefreshedSliceSegmentSet is defined as the set inclusive of the following:</u>
  - <u>all slice segments of all pictures of the reference layers that precede, in decoding order, the current picture and that may be used for reference by the current picture or subsequent pictures of the reference layers.</u>
  - <u>all slice segments of all pictures of the reference layers that succeed, in decoding order, the current picture and that belong to gdrAuSet.</u>
- <u>Otherwise, upSwitchingRefreshedSliceSegmentSet is defined as an empty set.</u>

When a gdr<u>Pic</u>~~Au~~Set contains one or more <u>pictures associated with</u> region refresh information SEI messages, it is a requirement of bitstream conformance that the following constraints all apply:
- For each layer in targetLayerIdList, the refreshed region in the first picture<u>, in decoding order,</u> ~~in~~ that belongs to the layer and that is included in ~~the corresponding~~ gdrPicSet ~~in decoding order~~ that contains any refreshed region shall contain only coding units that are coded in an intra coding mode <u>or inter-layer prediction from slice segments in</u>~~belonging to~~ the union of gdrRefreshedSliceSegmentSet <u>and upSwitchingRefreshedSliceSegmentSet</u>.
- For each picture included in the gdrPicSet, the syntax elements in gdrRefreshedSliceSegmentSet shall be constrained such that no samples or motion vector values outside of <u>the union of</u> gdrRefreshedSliceSegmentSet <u>and upSwitchingRefreshedSliceSegmentSet</u> are used for inter prediction <u>or inter-layer prediction</u> in the decoding process of any samples within gdrRefreshedSliceSegmentSet.
- For any picture that follows the picture lastPicInSet in output order, the syntax elements in the slice segments of the picture shall be constrained such that no samples or motion vector values outside of <u>the union of</u> gdrRefreshedSliceSegmentSet <u>and upSwitchingRefreshedSliceSegmentSet</u> are used for inter prediction <u>or inter-layer prediction</u> in the decoding process of the picture other than those of the other pictures that follow the picture lastPicInSet in output order.

F.3 Definitions
For the purpose of this annex, the following definitions apply in addition to the definitions in clause 3. These definitions are either not present in clause 3 or replace definitions in clause 3.
~~F.3.1 access unit: A set of NAL units that are associated with each other according to a specified classification rule, are consecutive in decoding order, and contain the VCL NAL units of all coded pictures associated with the same output time and their associated non-VCL NAL units.~~
~~F.3.2 NOTE1 – Pictures in the same access unit are associated with the same picture order count.~~
F.3.3 alternative output layer: A layer that is a direct reference layer or an indirect reference layer of an output layer and which may include a picture that may be output when no picture of the output layer is present in the access unit containing the picture.
F.7.4.3.1 Video parameter set RBSP semantics
The specifications in subclause 7.4.3.1 apply with following modifications and additions:
- layerSetLayerIdList is replaced by LayerSetLayerIdList.
- numLayersInIdList is replaced by NumLayersInIdList.

TABLE 1-continued

MV-HEVC modifications to Standards Text

Replace "Each operation point is identified by the associated layer identifier list, denoted as OpLayerIdList, which consists of the list of nuh_layer_id values of all NAL units included in the operation point, in increasing order of nuh_layer_id values, and a variable OpTid, which is equal to the highest TemporalId of all NAL units included in the operation point." with "Each operation point is identified by the associated layer identifier list, denoted as OpLayerIdList, which consists of the list of nuh_layer_id values of all NAL units included in the operation point, in increasing order of nuh_layer_id values, and a variable OpTid, which is equal to the highest TemporalId of all NAL units included in the operation point. Each output operation point is associated with an operaiton point and identified by the a list of nuh_layer_id values of all the pictures that are to be output, in increasing order of nuh_layer_id values, denoted as OptLayerIdList, andthe a variable OpTid of the associated operation point. The OpLayerIdList of the operation point assocaited with an output operation point is also referred to as the OpLayerIdList of the output operation point, which is equal to the highest TemporalId of all NAL units included in the operation point. The layer identifier list associated with the list OptLayerIdList, denoted as OpLayerIdList, consists of the list of nuh_layer_id values of all NAL units included in the operation point, in increasing order of nuh_layer_id values.".

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, ASICs, FPGAs, or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. For example, a scalable nesting recovery point SEI message may be associated with a plurality of pictures in one access unit and a single recovery point SEI message may additionally be associated with one of the pictures of the same access unit. The single recovery point SEI message may be associated with one of the same pictures that is associated with the scalable nesting recovery point SEI message or a different unassociated picture. Similar combinations of features are also contemplated including the addition of a region refresh information SEI message with a picture associated with a recovery point SEI message; however, the combinations of features between the respective embodiments are not necessarily limited thereto.

Various embodiments of the disclosure have been described. These and other embodiments are within the scope of the following claims.

What is claimed is:

1. A device for determining whether to initiate random access during decoding of a bitstream of multi-layer video data comprising:
   a memory configured to store video information that includes at least one recovery point supplemental enhancement information (SEI) message; and
   a processor in communication with the memory and configured to:
      determine whether the at least one recovery point SEI message comprises an indication to reset a picture order count (POC) value,
      in response to determining that the recovery point SEI message is present in an access unit, initiate the random access and decoding from the access unit, wherein to initiate the random access and decoding from the access unit, the processor is further configured to:
         identify a region refresh information SEI message associated with the recovery point SEI message, wherein the region refresh information SEI message includes a list of layer identification values for all reference layers used for inter-layer prediction of a current layer to which the region refresh SEI message applies;
         derive a value of a semantic associated with the POC value of the at least one recovery point SEI message when the processor determines to initiate random access and start decoding; and
         associate the at least one recovery point SEI message with the current layer when the recovery point SEI message is identified as applying to a picture of the current layer; and
      decode the current layer based on at least one layer of the reference layers and based on the association of the at least one recovery point SEI message with the current layer.

2. The device of claim 1, wherein to derive the value of the semantic associated with the POC value, the processor is configured to determine that the access unit comprising the recovery point SEI message is a first access unit in the bitstream in decoding order.

3. The device of claim 2, wherein the processor is further configured to determine if the semantic associated with the POC semantic of the recovery point SEI message is present in a slice header of a picture associated with the recovery point SEI message and calculate the value of the semantic associated with the POC semantic based on a presence of a POC most significant bit value.

4. The device of claim 2, wherein the processor is further configured to determine if the semantic associated with the POC semantic of the recovery point SEI message is not present in a slice header of a picture associated with the recovery point SEI message and establish a value of a previous POC for a specific layer to be zero.

5. The device of claim 1, wherein the processor is further configured to decode the current layer after at least one of the decoder initiates random access, layer up-switching, and after an encoder indicates a broken link.

6. The device of claim 1, wherein the region refresh information SEI message is further configured to indicate whether one or more regions to which the region refresh information SEI message applies are refreshed, wherein a refreshed region indicates that the one or more regions are correct and properly coded.

7. The device of claim 6, wherein the region refresh information SEI message indicating the refreshed region indicates that a layer of the reference layers or segments in the layer of the reference layers on which the refreshed region depends are refreshed.

8. The device of claim 7, wherein the region refresh information SEI message comprises a semantic configured to indicate an identifier of only the refreshed region when the refreshed region is refreshed independently of the other layers or segments.

9. A method for determining whether to initiate random access during decoding of a bitstream of multi-layer video data, the method comprising:
   storing video information that includes at least one recovery point supplemental enhancement information (SEI) message;
   determining whether the at least one recovery point SEI message comprises an indication to reset a picture order count (POC) value;
   in response to determining that the recovery point SEI message is present in an access unit, initiating the random access and decoding from the access unit, wherein initiating the random access and decoding from the access unit comprises:
      identifying a region refresh information SEI message associated with the recovery point SEI message, wherein the region refresh information SEI message includes a list of layer identification values for all reference layers used for inter-layer prediction of a current layer to which the region refresh SEI message applies;
      deriving a value of a semantic associated with the POC value of the at least one recovery point SEI message when initiating the random access and starting the decoding; and
      associating the at least one recovery point SEI message with the current layer when the recovery point SEI message is identified as applying to a picture of the current layer; and
   decoding the current layer based on at least one layer of the reference layers and based on the association of the at least one recovery point SEI message with the current layer.

10. The method of claim 9, wherein deriving the value of the semantic associated with the POC value comprises determining that the access unit comprising the recovery point SEI message is a first access unit in the multi-layer bitstream in decoding order.

11. The method of claim 10, further comprising determining if the semantic associated with the POC semantic of the recovery point SEI message is present in a slice header of a picture associated with the recovery point SEI message and calculating the value of the semantic associated with the POC semantic based on a presence of a POC most significant bit value.

12. The method of claim 10, further comprising determining if the semantic associated with the POC semantic of the recovery point SEI message is not present in a slice header of a picture associated with the recovery point SEI message and establishing a value of a previous POC for a specific layer to be zero.

13. The method of claim 9, further comprising determining acceptable pictures will be decoded in the current layer after at least one of the decoder initiates random access, layer up-switching, and after an encoder indicates a broken link.

14. The method of claim 9, wherein the region refresh information SEI message is further configured to indicate whether one or more regions to which the region refresh information SEI message applies are refreshed, wherein a refreshed region indicates that the one or more regions are correct and properly coded.

15. The method of claim 14, wherein the region refresh information SEI message indicating the refreshed region indicates that a layer of the reference layers or segments in the layer of the reference layers on which the refreshed region depends are refreshed.

16. The method of claim 15, wherein the region refresh information SEI message comprises a semantic configured to indicate an identifier of only the refreshed region when the refreshed region is refreshed independently of the other layers or segments.

17. A device for determining whether to initiate random access during decoding of a bitstream of multi-layer video data, the device comprising:
means for storing video information that includes at least one recovery point supplemental enhancement information (SEI) message;
means for determining whether the at least one recovery point SEI message comprises an indication to reset a picture order count (POC) value;
means for determining whether to initiate the random access and decoding from an access unit in response to determining that the recovery point SEI message is present in an access unit, wherein the means for determining whether to initiate the random access and decoding from the access unit comprises:
means for identifying a region refresh information SEI message associated with the recovery point SEI message, wherein the region refresh information SEI message includes a list of layer identification values for all reference layers used for inter-layer prediction of a current layer to which the region refresh SEI message applies;
means for deriving a value of a semantic associated with the POC value of the at least one recovery point SEI message the means for determining whether to initiate the random access and the decoding from the access unit determines to; and initiate the random access and the decoding from the access unit; and
means for associating the at least one recovery point SEI message with the current layer when the recovery point SEI message is identified as applying to a picture of the current layer; and
means for decoding the current layer based on at least one layer of the reference layers and based on the association of the at least one recovery point SEI message with the current layer.

18. The device of claim 17, wherein the means for deriving a value of the semantic associated with the POC value comprises means for the access unit comprising the recovery point SEI message is a first access unit in the multi-layer bitstream in decoding order.

19. The device of claim 18, further comprising means for determining if the semantic associated with the POC value of the recovery point SEI message is present in a slice header of a picture associated with the recovery point SEI message and means for calculating the value of the semantic associated with the POC value based on a presence of a POC most significant bit value.

20. The device of claim 18, further comprising means for determining if the semantic associated with the POC semantic of the recovery point SEI message is not present in a slice header of a picture associated with the recovery point SEI message and means for establishing a value of a previous POC for a specific layer to be zero.

21. A non-transitory computer readable storage medium having stored thereon instructions that, when executed, cause a processor of a device to:
store video information that includes at least one recovery point supplemental enhancement information (SEI) message;
determine whether the at least one recovery point SEI message comprises an indication to reset a picture order count (POC) value;
in response to determining that the recovery point SEI message is present in an access unit, initiate the random access and decoding from the access unit, wherein to determine whether to initiate the random access and decoding from the access unit, the instructions cause the processor to identify a region refresh information SEI message associated with the recovery point SEI message, derive a value of a semantic associated with the POC value of the at least one recovery point SEI message when the processor determines to initiate random access and start decoding, and associate the at least one recovery point SEI message with a current layer when the recovery point SEI message is identified as applying to a picture of the current layer, the region refresh information SEI message includes a list of layer identification values for all reference layers used for inter-layer prediction of the current layer to which the region refresh SEI message applies; and
decode the current layer based on at least one layer of the reference layers and based on the association of the at least one recovery point SEI message with the current layer.

22. The non-transitory computer readable storage medium of claim 21, wherein the instructions stored there causing the processor to derive a value of the semantic associated with the POC value comprise instructions stored thereon causing the processor to determine that the access unit comprising the recovery point SEI message is a first access unit in the multi-layer bitstream in decoding order.

23. The non-transitory computer readable storage medium of claim 22, further having stored thereon instructions that, when executed, cause the processor to:
determine if the semantic associated with the POC value of the recovery point SEI message is present in a slice header of a picture associated with the recovery point SEI message; and
calculate the value of the semantic associated with the POC value based on a presence of a POC most significant bit value.

24. The non-transitory computer readable storage medium of claim 22, further having stored thereon instructions that, when executed, cause the processor to:
- determine if the semantic associated with the POC semantic of the recovery point SEI message is not present in a slice header of a picture associated with the recovery point SEI message; and
- establish a value of a previous POC for a specific layer to be zero.

* * * * *